US012746658B2

(12) United States Patent
Hasegawa et al.

(10) Patent No.: US 12,746,658 B2
(45) Date of Patent: Sep. 29, 2026

(54) ROBOT, ROBOT CONTROL METHOD, AND RECORDING MEDIUM

(71) Applicant: CASIO COMPUTER CO., LTD., Tokyo (JP)

(72) Inventors: Hirokazu Hasegawa, Tokyo (JP); Kiyoshi Ogishima, Tokyo (JP); Kouki Mayuzumi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 41 days.

(21) Appl. No.: 18/888,179

(22) Filed: Sep. 18, 2024

(65) Prior Publication Data

US 2025/0162131 A1 May 22, 2025

(30) Foreign Application Priority Data

Nov. 16, 2023 (JP) ................................ 2023-195474

(51) Int. Cl.

| | |
|---|---|
| ***B25J 9/00*** | (2006.01) |
| ***B25J 11/00*** | (2006.01) |
| *A63H 5/00* | (2006.01) |
| *A63H 13/00* | (2006.01) |

(52) U.S. Cl.

CPC ........... *B25J 9/0003* (2013.01); *B25J 11/001* (2013.01); *A63H 5/00* (2013.01); *A63H 13/005* (2013.01); *A63H 2200/00* (2013.01)

(58) Field of Classification Search

CPC ......... B25J 9/0003; B25J 11/001; A63H 5/00; A63H 13/005; A63H 2200/00

See application file for complete search history.

(56) References Cited

U.S. PATENT DOCUMENTS 12,214,484 B2 2/2025 Hasegawa et al.
2002/0103576 A1 * 8/2002 Takamura ................ B25J 9/163 700/245
2019/0160683 A1 * 5/2019 Hayashi ................. B25J 19/023
(Continued)

FOREIGN PATENT DOCUMENTS

JP 2003285286 A 10/2003
JP 2018134735 A 8/2018
(Continued)

OTHER PUBLICATIONS

Japanese Office Action (and an English language translation thereof) dated Jan. 6, 2026, issued in counterpart Japanese Application No. 2023-195474.

*Primary Examiner* — Jason Holloway
*Assistant Examiner* — Alexander R. Morford
(74) *Attorney, Agent, or Firm* — Holtz, Holtz & Volek PC

(57) ABSTRACT

A robot to autonomously act includes a sensor to detect an external stimulus, and at least one processor, wherein the at least one processor causes, in a case where an action trigger that is predetermined is satisfied, the robot to execute an action selected, from a selection candidate list corresponding to the action trigger, at a selection probability dependent on a growth level, the growth level representing a degree of pseudo-growth of the robot, and changes, in a case where the sensor detects the external stimulus during a period from when the robot is caused to execute the action until an elapse of a predetermined time, the selection probability that the action is selected from the selection candidate list.

18 Claims, 15 Drawing Sheets

(56) References Cited

U.S. PATENT DOCUMENTS

| | | | | |
|---|---|---|---|---|
| 2022/0299999 | A1* | 9/2022 | Hasegawa | G05D 1/0212 |
| 2023/0281495 | A1* | 9/2023 | Dan | G06N 20/00 706/46 |
| 2025/0144809 | A1 | 5/2025 | Hasegawa et al. | |

FOREIGN PATENT DOCUMENTS

| | | | |
|---|---|---|---|
| JP | 2023099625 | A | 7/2023 |
| JP | 2023115370 | A | 8/2023 |

* cited by examiner

FIG. 7

INITIAL TABLE 131

| ACTION TRIGGER | ACTION | GROWTH LEVEL | | | | | | | | | | |
|---|---|---|---|---|---|---|---|---|---|---|---|---|
| | | 0 | 1 | 2 | 3 | 4 | 5 | 6 | 7 | 8 | 9 | 10 |
| PETTED | BASIC ACTION 0-0 | 100 | 100 | 80 | 80 | 30 | 30 | 20 | 20 | 20 | 20 | 10 |
| | BASIC ACTION 0-1 | 0 | 0 | 20 | 20 | 50 | 50 | 20 | 20 | 20 | 20 | 10 |
| | BASIC ACTION 0-2 | 0 | 0 | 0 | 0 | 20 | 20 | 40 | 40 | 20 | 20 | 20 |
| | BASIC ACTION 0-3 | 0 | 0 | 0 | 0 | 0 | 0 | 20 | 20 | 20 | 20 | 20 |
| | PERSONALITY ACTION 0-0 | 0 | 0 | 0 | 0 | 0 | 0 | 0 | 0 | 20 | 20 | 40 |
| SPOKEN TO | BASIC ACTION 1-0 | 100 | 90 | 80 | 80 | 60 | 60 | 30 | 30 | 30 | 30 | 30 |
| | BASIC ACTION 1-1 | 0 | 10 | 20 | 20 | 40 | 40 | 50 | 50 | 40 | 40 | 30 |
| | PERSONALITY ACTION 1-0 | 0 | 0 | 0 | 0 | 0 | 0 | 20 | 20 | 30 | 30 | 40 |
| THERE IS LOUD SOUND | BASIC ACTION 2-0 | 100 | 90 | 80 | 80 | 60 | 60 | 30 | 30 | 20 | 20 | 20 |
| | BASIC ACTION 2-1 | 0 | 10 | 20 | 20 | 40 | 40 | 50 | 50 | 20 | 20 | 20 |
| | BASIC ACTION 2-2 | 0 | 0 | 0 | 0 | 0 | 0 | 20 | 20 | 40 | 40 | 20 |
| | PERSONALITY ACTION 2-0 | 0 | 0 | 0 | 0 | 0 | 0 | 0 | 0 | 20 | 20 | 40 |
| CERTAIN AMOUNT OF TIME PASSED | BASIC ACTION 3-0 | 100 | 90 | 80 | 80 | 60 | 60 | 30 | 30 | 20 | 20 | 20 |
| | BASIC ACTION 3-1 | 0 | 10 | 20 | 20 | 40 | 40 | 50 | 50 | 20 | 20 | 20 |
| | BASIC ACTION 3-2 | 0 | 0 | 0 | 0 | 0 | 0 | 20 | 20 | 40 | 40 | 20 |
| | PERSONALITY ACTION 3-0 | 0 | 0 | 0 | 0 | 0 | 0 | 0 | 0 | 20 | 20 | 40 |
| ⋮ | ⋮ | ⋮ | ⋮ | ⋮ | ⋮ | ⋮ | ⋮ | ⋮ | ⋮ | ⋮ | ⋮ | ⋮ |

FIG. 8

ACTION CONTENT TABLE 124

| ACTION | PERSONALITY | ACTION CONTENT |
|---|---|---|
| BASIC ACTION 0-0 | | YELP |
| BASIC ACTION 0-1 | | HOWL |
| BASIC ACTION 0-2 | | MEOW |
| BASIC ACTION 0-3 | | SAY WHEE-OH |
| PERSONALITY ACTION 0-0 | CHIPPER | YELP CHIPPERLY |
| | ACTIVE | SING ENERGETICALLY WITH RATTATA |
| | SHY | SIGH SHYLY |
| | SPOILED | HOWL SPOILEDLY |
| BASIC ACTION 1-0 | | SAY "WHAT?" |
| BASIC ACTION 1-1 | | SAY "WHAAAT?" |
| PERSONALITY ACTION 1-0 | CHIPPER | SAY "WHAAAT?" CHIPPERLY |
| | ACTIVE | SAY "WHAAAT?" ENERGETICALLY |
| | SHY | SAY "WHAAAT?" SHYLY |
| | SPOILED | SAY "WHAAAT?" SPOILEDLY |
| BASIC ACTION 2-0 | | WHISTLE ABRUPTLY |
| BASIC ACTION 2-1 | | SCREAM |
| BASIC ACTION 2-2 | | HOWL LONGLY |
| PERSONALITY ACTION 2-0 | CHIPPER | SQUEAL CHIPPERLY |
| | ACTIVE | SQUEAL ENERGETICALLY |
| | SHY | SQUEAL SHYLY |
| | SPOILED | SQUEAL SPOILEDLY |
| BASIC ACTION 3-0 | | ACTION OF FIDGETING |
| BASIC ACTION 3-1 | | ACTION OF LOOKING AROUND |
| BASIC ACTION 3-2 | | ACTION OF YAWNING |
| PERSONALITY ACTION 3-0 | CHIPPER | CHIPPER ACTION |
| | ACTIVE | ENERGETIC ACTION |
| | SHY | SHY ACTION |
| | SPOILED | SPOILED ACTION |
| ⋮ | ⋮ | ⋮ |

FIG. 9

MOTION TABLE 125

| ACTION | TIME (ms) | TWIST MOTOR | VERTICAL MOTOR | SOUND |
|---|---|---|---|---|
| ⋮ | ⋮ | ⋮ | ⋮ | ⋮ |
| BASIC ACTION 2-0 (WHEN THERE IS LOUD SOUND) | 100 | 0 | 0 | WHISTLE ABRUPTLY |
| | 100 | 0 | -24 | |
| | 700 | 0 | -24 | |
| | 500 | 34 | -24 | |
| | 400 | -34 | -24 | |
| | 500 | 0 | 0 | |
| ⋮ | ⋮ | ⋮ | ⋮ | ⋮ |
| PERSONALITY ACTION 2-0 CHIPPER (WHEN THERE IS LOUD SOUND) | 100 | 0 | 0 | SQUEAL CHIPPERLY |
| | 100 | 0 | -24 | |
| | 700 | 0 | -24 | |
| | 500 | 34 | -24 | |
| | 400 | -34 | -24 | |
| | 500 | 0 | 0 | |
| ⋮ | ⋮ | ⋮ | ⋮ | ⋮ |
| SPONTANEOUS ACTION 0-0 (BREATHING ACTION) | 750 | 0 | 30 | NO SOUND |
| | 800 | 0 | 24 | |
| ⋮ | ⋮ | ⋮ | ⋮ | ⋮ |

FIG. 10

CLASSIFICATION TABLE 127

| FIRST TYPE (POSITIVE RESPONSE) | SECOND TYPE (NEGATIVE RESPONSE) | OTHER |
|---|---|---|
| PRAISED<br>PETTED<br>ROCKED GENTLY<br>HELD<br>.<br>.<br>. | SCOLDED<br>STRUCK<br>ROCKED FORCEFULLY<br>TURNED UPSIDE DOWN<br>.<br>.<br>. | BECAME BRIGHTER<br>BECAME DARKER<br>SPECIFIC TIME ARRIVED<br>MOVED TO SPECIFIC LOCATION<br>.<br>.<br>. |

FIG. 11

ADJUSTMENT TABLE 132

| ACTION TRIGGER | ACTION | GROWTH LEVEL | | | | | | | | | | |
|---|---|---|---|---|---|---|---|---|---|---|---|---|
| | | 0 | 1 | 2 | 3 | 4 | 5 | 6 | 7 | 8 | 9 | 10 |
| PETTED | BASIC ACTION 0-0 | 100 | 100 | 80 | 80 | 30 | 30 | 20 | 20 | 20 | | |
| | BASIC ACTION 0-1 | 0 | 0 | 20 | 20 | 50 | 50 | 20 | 20 | 20 | | |
| | BASIC ACTION 0-2 | 0 | 0 | 0 | 0 | 20 | 20 | 40 | 40 | 20 | | |
| | BASIC ACTION 0-3 | 0 | 0 | 0 | 0 | 0 | 0 | 20 | 20 | 20 | | |
| | PERSONALITY ACTION 0-0 | 0 | 0 | 0 | 0 | 0 | 0 | 0 | 0 | 20 | | |
| SPOKEN TO | BASIC ACTION 1-0 | 100 | 90 | 80 | 80 | 60 | 60 | 30 | 30 | 30 | | |
| | BASIC ACTION 1-1 | 0 | 10 | 20 | 20 | 40 | 40 | 50 | 50 | 40 | | |
| | PERSONALITY ACTION 1-0 | 0 | 0 | 0 | 0 | 0 | 0 | 20 | 20 | 30 | | |
| THERE IS LOUD SOUND | BASIC ACTION 2-0 | 100 | 90 | 80 | 80 | 60 | 60 | 30 | 30 | 20.3 | | |
| | BASIC ACTION 2-1 | 0 | 10 | 20 | 20 | 40 | 40 | 50 | 50 | 19.9 | | |
| | BASIC ACTION 2-2 | 0 | 0 | 0 | 0 | 0 | 0 | 20 | 20 | 39.9 | | |
| | PERSONALITY ACTION 2-0 | 0 | 0 | 0 | 0 | 0 | 0 | 0 | 0 | 19.9 | | |
| CERTAIN AMOUNT OF TIME PASSED | BASIC ACTION 3-0 | 100 | 90 | 80 | 80 | 60 | 60 | 30 | 30 | 20 | | |
| | BASIC ACTION 3-1 | 0 | 10 | 20 | 20 | 40 | 40 | 50 | 50 | 20 | | |
| | BASIC ACTION 3-2 | 0 | 0 | 0 | 0 | 0 | 0 | 20 | 20 | 40 | | |
| | PERSONALITY ACTION 3-0 | 0 | 0 | 0 | 0 | 0 | 0 | 0 | 0 | 20 | | |
| ⋮ | ⋮ | ⋮ | ⋮ | ⋮ | ⋮ | ⋮ | ⋮ | ⋮ | ⋮ | ⋮ | | |

FIG. 12

GROWTH INDEX TABLE 133

| ACTION TRIGGER | ACTION | GROWTH LEVEL | | | | | | | | | | |
|---|---|---|---|---|---|---|---|---|---|---|---|---|
| | | 0 | 1 | 2 | 3 | 4 | 5 | 6 | 7 | 8 | 9 | 10 |
| PETTED | BASIC ACTION 0-0 | 0 | -20 | 0 | -50 | 0 | -10 | 0 | 0 | 0 | -10 | - |
| | BASIC ACTION 0-1 | 0 | +20 | 0 | +30 | 0 | -30 | 0 | 0 | 0 | -10 | - |
| | BASIC ACTION 0-2 | 0 | 0 | 0 | 0 | 0 | +20 | 0 | -20 | 0 | 0 | - |
| | BASIC ACTION 0-3 | 0 | 0 | 0 | 0 | 0 | +20 | 0 | 0 | 0 | 0 | - |
| | PERSONALITY ACTION 0-0 | 0 | 0 | 0 | 0 | 0 | 0 | 0 | +20 | 0 | +20 | - |
| SPOKEN TO | BASIC ACTION 1-0 | -10 | -10 | 0 | -20 | 0 | -30 | 0 | 0 | 0 | 0 | - |
| | BASIC ACTION 1-1 | 0 | +10 | 0 | +20 | 0 | +10 | 0 | -10 | 0 | -10 | - |
| | PERSONALITY ACTION 1-0 | 0 | 0 | 0 | 0 | 0 | +20 | 0 | +10 | 0 | +10 | - |
| THERE IS LOUD SOUND | BASIC ACTION 2-0 | -10 | -10 | 0 | -20 | 0 | -30 | 0 | -10 | 0 | 0 | - |
| | BASIC ACTION 2-1 | +10 | +10 | 0 | +20 | 0 | +10 | 0 | -30 | 0 | 0 | - |
| | BASIC ACTION 2-2 | 0 | 0 | 0 | 0 | 0 | +20 | 0 | +20 | 0 | -20 | - |
| | PERSONALITY ACTION 2-0 | 0 | 0 | 0 | 0 | 0 | 0 | 0 | +20 | 0 | +20 | - |
| CERTAIN AMOUNT OF TIME PASSED | BASIC ACTION 3-0 | -10 | -10 | 0 | -20 | 0 | -30 | 0 | -10 | 0 | 0 | - |
| | BASIC ACTION 3-1 | +10 | +10 | 0 | +20 | 0 | +10 | 0 | -30 | 0 | 0 | - |
| | BASIC ACTION 3-2 | 0 | 0 | 0 | 0 | 0 | +20 | 0 | +20 | 0 | -20 | - |
| | PERSONALITY ACTION 3-0 | 0 | 0 | 0 | 0 | 0 | 0 | 0 | +20 | 0 | +20 | - |
| ⋮ | ⋮ | ⋮ | ⋮ | ⋮ | ⋮ | ⋮ | ⋮ | ⋮ | ⋮ | ⋮ | ⋮ | ⋮ |

FIG. 13

ADJUSTMENT TABLE 132

| ACTION TRIGGER | ACTION | GROWTH LEVEL | | | | | | | | | | |
|---|---|---|---|---|---|---|---|---|---|---|---|---|
| | | 0 | 1 | 2 | 3 | 4 | 5 | 6 | 7 | 8 | 9 | 10 |
| PETTED | BASIC ACTION 0-0 | 100 | 100 | 80 | 80 | 30 | 30 | 20 | 20 | 20 | 20 | 10 |
| | BASIC ACTION 0-1 | 0 | 0 | 20 | 20 | 50 | 50 | 20 | 20 | 20 | 20 | 10 |
| | BASIC ACTION 0-2 | 0 | 0 | 0 | 0 | 20 | 20 | 40 | 40 | 20 | 20 | 20 |
| | BASIC ACTION 0-3 | 0 | 0 | 0 | 0 | 0 | 0 | 20 | 20 | 20 | 20 | 20 |
| | PERSONALITY ACTION 0-0 | 0 | 0 | 0 | 0 | 0 | 0 | 0 | 0 | 20 | 20 | 40 |
| SPOKEN TO | BASIC ACTION 1-0 | 100 | 90 | 80 | 80 | 60 | 60 | 30 | 30 | 30 | 30 | 30 |
| | BASIC ACTION 1-1 | 0 | 10 | 20 | 20 | 40 | 40 | 50 | 50 | 40 | 40 | 30 |
| | PERSONALITY ACTION 1-0 | 0 | 0 | 0 | 0 | 0 | 0 | 20 | 20 | 30 | 30 | 40 |
| THERE IS LOUD SOUND | BASIC ACTION 2-0 | 100 | 90 | 80 | 80 | 60 | 60 | 30 | 30 | 26 | 26 | 26 |
| | BASIC ACTION 2-1 | 0 | 10 | 20 | 20 | 40 | 40 | 50 | 50 | 18 | 18 | 18 |
| | BASIC ACTION 2-2 | 0 | 0 | 0 | 0 | 0 | 0 | 20 | 20 | 38 | 38 | 18 |
| | PERSONALITY ACTION 2-0 | 0 | 0 | 0 | 0 | 0 | 0 | 0 | 0 | 18 | 18 | 38 |
| CERTAIN AMOUNT OF TIME PASSED | BASIC ACTION 3-0 | 100 | 90 | 80 | 80 | 60 | 60 | 30 | 30 | 20 | 20 | 20 |
| | BASIC ACTION 3-1 | 0 | 10 | 20 | 20 | 40 | 40 | 50 | 50 | 20 | 20 | 20 |
| | BASIC ACTION 3-2 | 0 | 0 | 0 | 0 | 0 | 0 | 20 | 20 | 40 | 40 | 20 |
| | PERSONALITY ACTION 3-0 | 0 | 0 | 0 | 0 | 0 | 0 | 0 | 0 | 20 | 20 | 40 |
| ⋮ | ⋮ | ⋮ | ⋮ | ⋮ | ⋮ | ⋮ | ⋮ | ⋮ | ⋮ | ⋮ | ⋮ | ⋮ |

FIG. 17

PRIORITY TABLE 128

| ACTION TRIGGER | ACTION | PRIORITY |
|---|---|---|
| PETTED | BASIC ACTION 0-0 | 5 |
| | BASIC ACTION 0-1 | 4 |
| | BASIC ACTION 0-2 | 3 |
| | BASIC ACTION 0-3 | 2 |
| | PERSONALITY ACTION 0-0 | 1 |
| SPOKEN TO | BASIC ACTION 1-0 | 3 |
| | BASIC ACTION 1-1 | 2 |
| | PERSONALITY ACTION 1-0 | 1 |
| THERE IS LOUD SOUND | BASIC ACTION 2-0 | 4 |
| | BASIC ACTION 2-1 | 3 |
| | BASIC ACTION 2-2 | 2 |
| | PERSONALITY ACTION 2-0 | 1 |
| CERTAIN AMOUNT OF TIME PASSED | BASIC ACTION 3-0 | 4 |
| | BASIC ACTION 3-1 | 3 |
| | BASIC ACTION 3-2 | 2 |
| | PERSONALITY ACTION 3-0 | 1 |
| ⋮ | ⋮ | ⋮ |

ROBOT, ROBOT CONTROL METHOD, AND RECORDING MEDIUM

CROSS-REFERENCE TO RELATED APPLICATIONS

This application is based upon and claims the benefit of priority under 35 USC 119 of Japanese Patent Application No. 2023-195474, filed on Nov. 16, 2023, the entire disclosure of which, including the description, claims, drawings, and abstract, is incorporated herein by reference in its entirety.

FIELD OF THE INVENTION

The present disclosure relates to a robot, a robot control method, and a recording medium.

BACKGROUND OF THE INVENTION

In the related art, robots are known that simulate living creatures such as pets and humans. For example, Unexamined Japanese Patent Application Publication No. 2003-285286 describes a robot device that can cause a user to feel a sense of pseudo-growth by acting out a scenario corresponding to a value of a growth level to express development of a living creature.

SUMMARY OF THE INVENTION

A robot according to an embodiment of the present disclosure includes:

a robot to autonomously act;

a sensor to detect an external stimulus; and at least one processor, wherein the at least one processor causes, in a case where an action trigger that is predetermined is satisfied, the robot to execute an action selected, from a selection candidate list corresponding to the action trigger, at a selection probability dependent on a growth level, the growth level representing a degree of pseudo-growth of the robot, and changes, in a case where the sensor detects the external stimulus during a period from when the robot is caused to execute the action until an elapse of a predetermined time, the selection probability that the action is selected from the selection candidate list.

BRIEF DESCRIPTION OF DRAWINGS

A more complete understanding of this application can be obtained when the following detailed description is considered in conjunction with the following drawings, in which:

FIG. 7 is a drawing illustrating an example of an initial table according to Embodiment 1;

FIG. 8 is a drawing illustrating an example of an action content table according to Embodiment 1;

FIG. 9 is a drawing illustrating an example of a motion table according to Embodiment 1;

FIG. 10 is a drawing illustrating an example of a classification table according to Embodiment 1;

FIG. 11 is a first drawing illustrating an example of an adjustment table according to Embodiment 1;

FIG. 12 is a drawing illustrating an example of a growth index table according to Embodiment 1;

FIG. 13 is a second drawing illustrating an example of the adjustment table according to Embodiment 1;

FIG. 17 is a drawing illustrating an example of a priority table according to Embodiment 2.

DETAILED DESCRIPTION OF THE INVENTION

Figure 1:
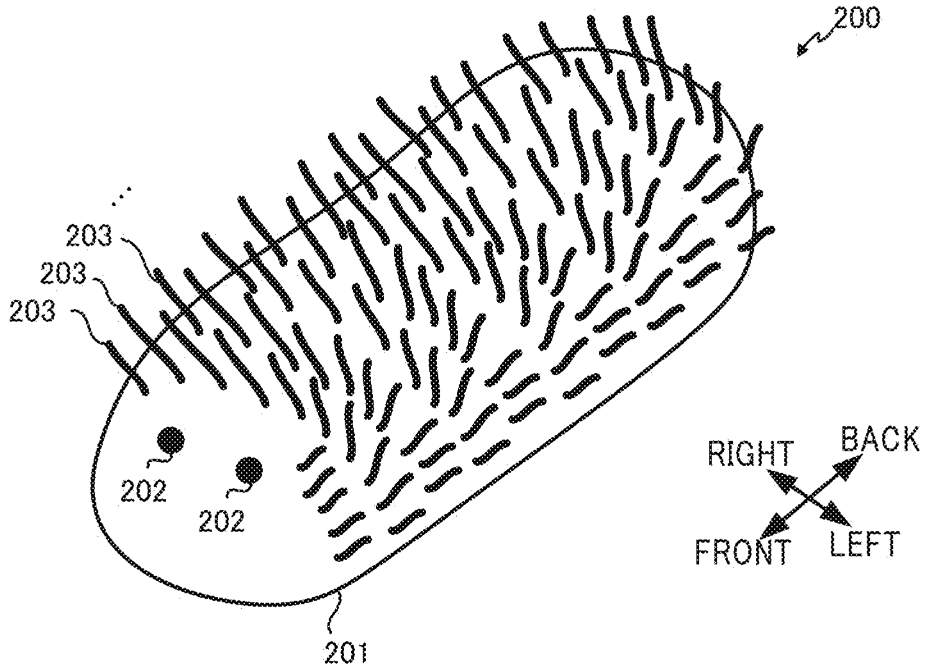
FIG. 1 illustrates an appearance of a robot according to Embodiment 1.

Hereinafter, embodiments of the present disclosure are described with reference to the drawings. Note that, in the drawings, identical or corresponding components are denoted with the same reference numerals.

Embodiment 1

Figure 2:
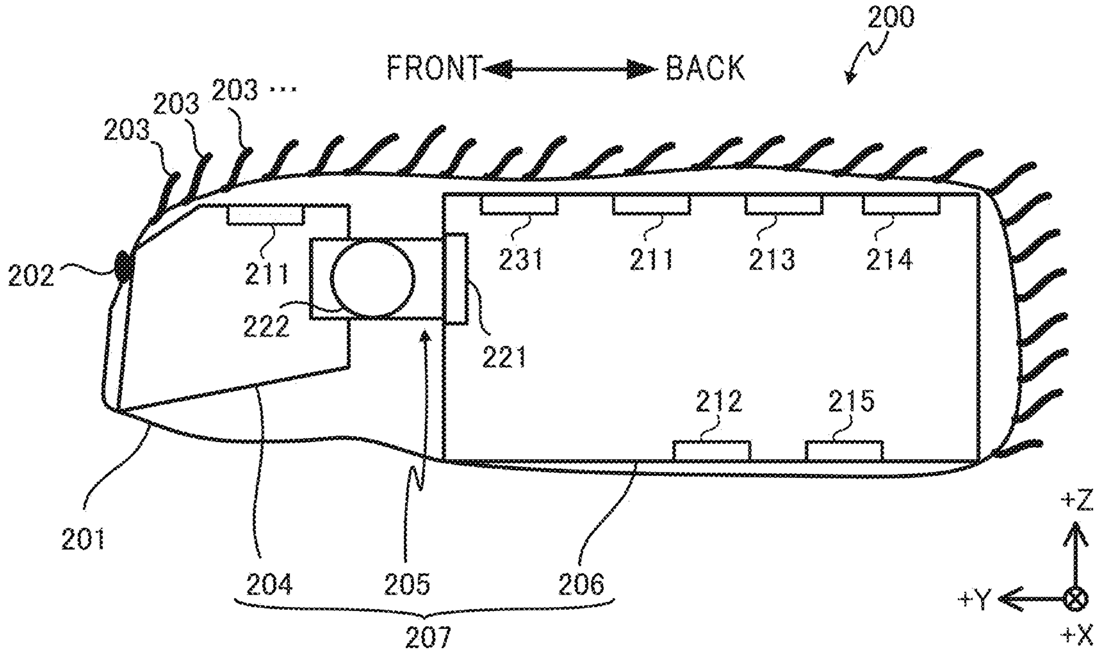
FIG. 2 is a cross-sectional view of a robot according to Embodiment 1, viewed from the side.

FIGS. 1 to 2 illustrate appearances of a robot 200 according to Embodiment 1. The robot 200 is a device that autonomously acts without direct operations by a user.

The robot 200 according to Embodiment 1 includes an exterior 201, decorative parts 202, bushy fur 203, head 204, coupler 205, torso 206, housing 207, touch sensor 211, acceleration sensor 212, microphone 213, illuminance sensor 214, and speaker 231 identical to those of the robot 200 disclosed in Unexamined Japanese Patent Application Publication No. 2023-115370 and, as such, description thereof is foregone. Note that the shape of the head 204 may be the shape illustrated in FIG. 2, or may, for example, be the shape disclosed in FIG. 2 of Unexamined Japanese Patent Application Publication No. 2023-115370.

The robot 200 according to Embodiment 1 includes a twist motor 221 and a vertical motor 222 identical to those of the robot 200 disclosed in Unexamined Japanese Patent Application Publication No. 2023-115370 and, as such, description thereof is foregone. The twist motor 221 and the vertical motor 222 of the robot 200 according to Embodiment 1 operate in the same manner as those of the robot 200 disclosed in Unexamined Japanese Patent Application Publication No. 2023-115370.

The robot 200 includes a gyrosensor 215. With the acceleration sensor 212 and the gyrosensor 215, the robot 200 can detect a change of an attitude of the robot 200 itself, and can detect being picked up, the orientation being changed, being thrown, and the like by the user.

The acceleration sensor 212, the microphone 213, the gyrosensor 215, the illuminance sensor 214, and the speaker 231 are not necessarily provided only on the torso 206, and at least a portion of these elements may be provided on the head 204, or may be provided on both the torso 206 and the head 204.

Figure 3:
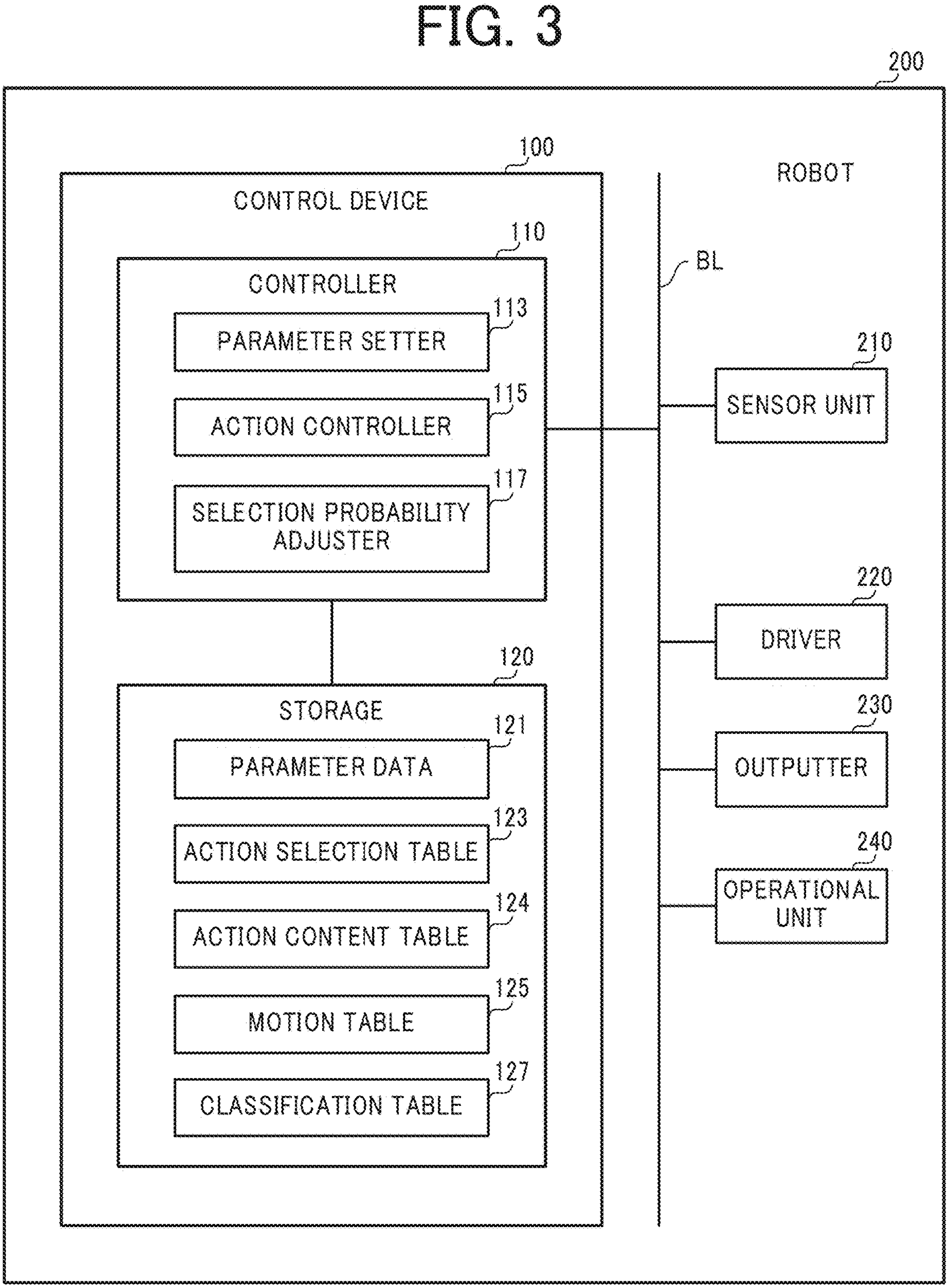
FIG. 3 is a block diagram illustrating a configuration of the robot according to Embodiment 1.

Next, a functional configuration of the robot 200 is described with reference to FIG. 3. As illustrated in FIG. 3, the robot 200 includes a control device 100, a sensor unit 210, a driver 220, an outputter 230, and an operational unit 240. In one example, these components are connected via a bus line BL. Note that a configuration may be employed in which, instead of the bus line BL, a wired interface such as a universal serial bus (USB) cable, or a wireless interface such as Bluetooth (registered trademark) is used.

The control device 100 includes a controller 110, a storage 120, and a communicator 130. The control device 100 controls the actions of the robot 200 by the controller 110 and the storage 120.

The controller 110 includes a central processing unit (CPU). In one example, the CPU is a microprocessor or the like and is a central processing unit that executes a variety of processing and operations. In the controller 110, the CPU reads a control program stored in a read-only memory (ROM) and controls the actions of the entire robot 200 while using a random access memory (RAM) as a working memory. Additionally, although not illustrated in the drawings, the controller 110 is provided with a clock function, a timer function, and the like, and thus can measure the date and time, and the like. The controller 110 may also be called a "processor".

The storage 120 includes a read-only memory (ROM), a random access memory (RAM), a flash memory, and the like. The storage 120 stores programs and data, including an operating system (OS) and an application program, to be used by the controller 110 to execute various types of processing. Moreover, the storage 120 stores data generated or acquired through execution of the various types of processing by the controller 110.

The sensor unit 210 includes the touch sensor 211, the acceleration sensor 212, the gyrosensor 215, the illuminance sensor 214, and the microphone 213 described above. The sensor unit 210 is an example of detection means for detecting an external stimulus.

The touch sensor 211 includes, for example, a pressure sensor and an electrostatic capacitance sensor, and detects contacting by some sort of object. The controller 110 can detect, based on detection values of the touch sensor 211, that the robot 200 is being petted, is being struck, and the like by the user.

The acceleration sensor 212 detects an acceleration applied to the torso 206 of the robot 200. The acceleration sensor 212 detects an acceleration in each of an X-axis direction, a Y-axis direction, and a Z-axis direction, that is, acceleration on three axes.

In one example, the acceleration sensor 212 detects a gravitational acceleration when the robot 200 is stationary. The controller 110 can detect a current attitude of the robot 200 based on the gravitational acceleration detected by the acceleration sensor 212. In other words, the controller 110 can detect, based on the gravitational acceleration detected by the acceleration sensor 212, whether the housing 207 of the robot 200 is inclined from a horizontal direction. Thus, the acceleration sensor 212 functions as incline detection means for detecting the inclination of the robot 200.

In addition, if a user is lifting or throwing the robot 200, the acceleration sensor 212 detects an acceleration caused by the travel of the robot 200 in addition to the gravitational acceleration. The controller 110 subtracts a component of gravitational acceleration from the detection value detected by the acceleration sensor 212 and can thereby detect the action of the robot 200.

The gyrosensor 215 detects an angular velocity when rotation is applied to the torso 206 of the robot 200. Specifically, the gyrosensor 215 detects the angular velocity on three axes of rotation, namely rotation around the X-axis direction, rotation around the Y-axis direction, and rotation around the Z-axis direction. Combining the detection values detected by the acceleration sensor 212 and the detection values detected by the gyrosensor 215 enables more accurate detection of the movement of the robot 200.

The touch sensor 211, the acceleration sensor 212, and the gyrosensor 215 respectively detect a strength of contact, the acceleration, and the angular velocity, at a synchronized timing, for example, every 0.25 seconds, and output the detection values to the controller 110.

The microphone 213 detects ambient sound of the robot 200. The controller 110 can detect, based on a component of the sound detected by the microphone 213, for example, that the user is speaking to the robot 200, that the user is clapping hands, and the like.

The illuminance sensor 214 detects ambient illuminance of the robot 200. The controller 110 can detect, based on the illuminance detected by the illuminance sensor 214, that the surroundings of the robot 200 have become brighter or darker.

The controller 110 acquires, via the bus line BL and as an external stimulus, detection values detected by the various sensors included in the sensor unit 210. The external stimulus is a stimulus that acts on the robot 200 from outside the robot 200. Examples of the external stimulus include "there is a loud sound", "spoken to", "petted", "lifted up", "turned upside down", "became brighter", "became darker", and the like.

In one example, the controller 110 acquires the external stimulus of "there is aloud sound" or "spoken to" by the microphone 213, and acquires the external stimulus of "petted" by the touch sensor 211. Additionally, the controller 110 acquires the external stimulus of "lifted up" or "turned upside down" by the acceleration sensor 212 and the gyrosensor 215, and acquires the external stimulus of "became brighter" or "became darker" by the illuminance sensor 214.

The sensor unit 210 may include a sensor other than the touch sensor 211, the acceleration sensor 212, the gyrosensor 215, and the microphone 213. The types of external stimuli acquirable by the controller 110 can be increased by increasing the types of sensors included in the sensor unit 210.

The driver 220 includes the twist motor 221 and the vertical motor 222, and is driven by the controller 110. The twist motor 221 is a servo motor for rotating the head 204, relative to the torso 206, in the right-left direction (the width direction) about the front-rear direction as an axis. The vertical motor 222 is a servo motor for rotating the head 204, relative to the torso 206, in the up-down direction (height direction) about the right-left direction as an axis. The robot 200 can express actions of turning the head 204 sideways by using the twist motor 221, and can express actions of lifting/lowering the head 204 by using the vertical motor 222.

The outputter 230 includes the speaker 231, and the speaker 231 outputs sound as a result of the controller 110 inputting sound data into the outputter 230. For example, the robot 200 emits a pseudo-animal sound as a result of the controller 110 inputting animal sound data of the robot 200 into the outputter 230.

Instead of the speaker 231, or in addition to the speaker 231, a display such as a liquid crystal display, a light emitter such as a light emitting diode (LED), or the like may be provided as the outputter 230, to display emotions such as joy, sadness, and the like on the display, express such emotions by the color and brightness of emitted light, or the like.

The operational unit 240 includes an operation button, a volume knob, or the like. In one example, the operational unit 240 is an interface for receiving user operations such as turning the power ON/OFF, adjusting the volume of the output sound, and the like.

Next, a functional configuration of the controller 110 is described. As illustrated in FIG. 3, the controller 110 functionally includes a parameter setter 113 that is an example of parameter setting means, an action controller 115 that is an example of action control means, and a selection probability adjuster 117 that is an example of selection probability adjustment means. In the controller 110, the CPU performs control by reading the program stored in the ROM into the RAM and executing this program, to thereby function as the components described above.

The storage 120 stores parameter data 121, an action selection table 123, an action content table 124, a motion table 125, and a classification table 127.

The parameter setter 113 sets the parameter data 121. The parameter data 121 is data that defines various types of parameters related to the robot 200. Specifically, the parameter data 121 contains: (1) an emotion parameter, (2) a personality parameter, (3) a growth days count, and (4) a growth level.

(1) Emotion Parameter

The emotion parameter is a parameter that represents a pseudo-emotion of the robot 200. The emotion parameter is expressed by coordinates (X, Y) on an emotion map 300.

Figure 4:
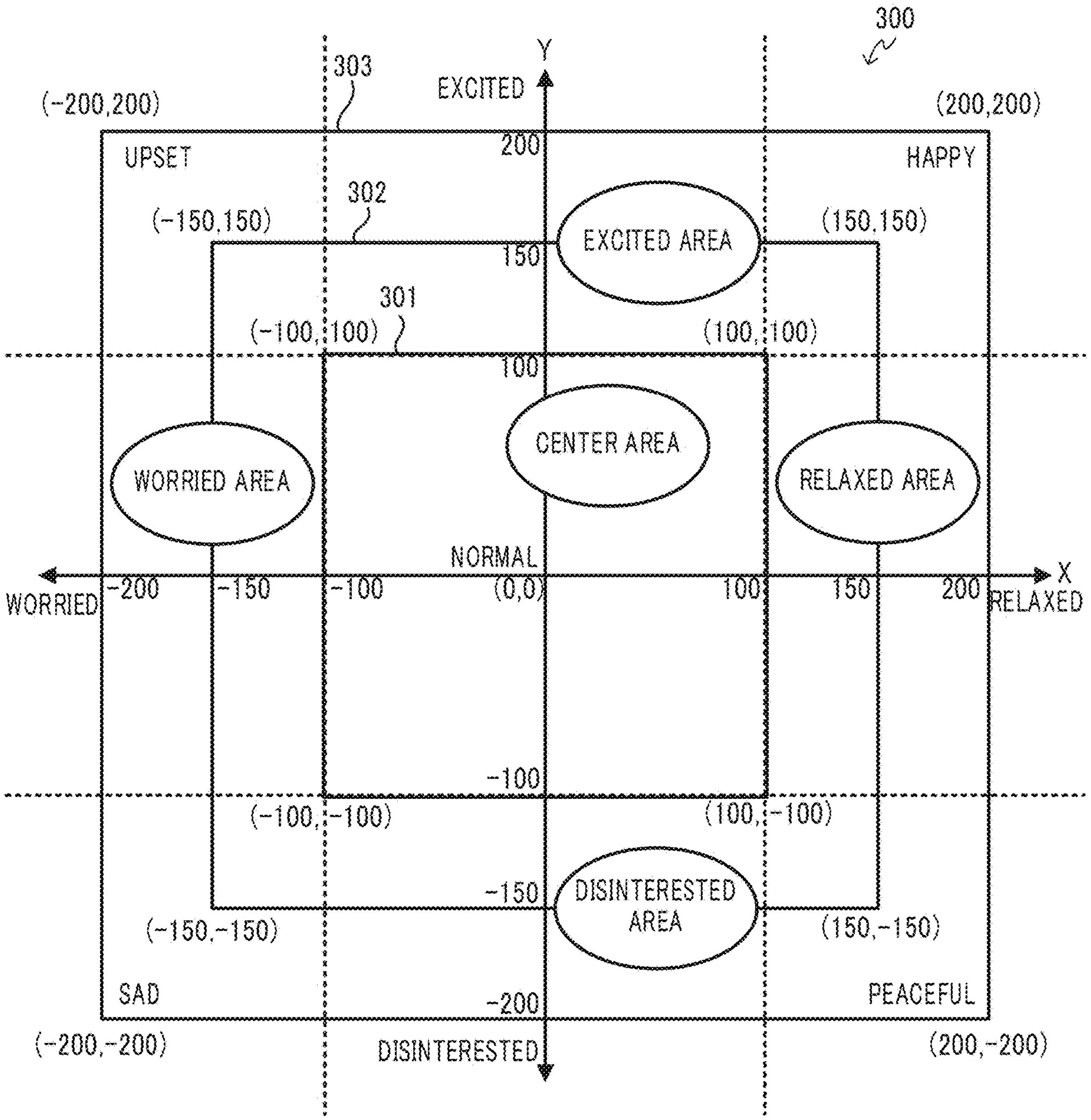
FIG. 4 is a drawing illustrating an example of an emotion map according to Embodiment 1.

As illustrated in FIG. 4, the emotion map 300 is expressed by a two-dimensional coordinate system having a degree of relaxation (degree of worry) axis as the X axis, and a degree of excitement (degree of disinterest) axis as the Y axis. The origin (0, 0) on the emotion map 300 represents an emotion when in the normal time. When a value of an X-coordinate (X value) is positive, a larger absolute value thereof represents an emotion with a higher degree of relaxation, and when the value of the X value is negative, a larger absolute value thereof represents an emotion with a higher degree of worry. When a value of a Y-coordinate (Y value) is positive, a larger absolute value thereof represents an emotion with a higher degree of excitement, and when the Y value is negative, a larger absolute value thereof represents an emotion with a higher degree of disinterest.

The emotion parameter represents a plurality of mutually different pseudo-emotions. In FIG. 4, of the values representing pseudo-emotions, the degree of relaxation and the degree of worry are represented together on one axis (X axis), and the degree of excitement and the degree of disinterest are represented together on another axis (Y axis). Accordingly, the emotion parameter has two values, namely the X value (degree of relaxation, degree of worry) and the Y value (degree of excitement, degree of disinterest), and a point on the emotion map 300 represented by the X value and the Y value represents the pseudo-emotions of the robot 200. An initial value of the emotion parameter is (0, 0).

Although the emotion map 300 is expressed in the two-dimensional coordinate system in FIG. 4, any dimension may be used for the emotion map 300. A configuration may be employed in which the emotion map 300 is defined by one dimension, and one value is set as the emotion parameter. Additionally, a configuration may be employed in which one or more axes are added and the emotion map 300 is defined by a coordinate system of three or more dimensions, and a number of values corresponding to the number of dimensions of the emotion map 300 are set as the emotion parameter.

The parameter setter 113 calculates an emotion change amount that is an amount of change that increases or decreases the X value and the Y value of the emotion parameter. The emotion change amount is expressed by the following four variables. DXP and DXM respectively increase and decrease the X value of the emotion parameter. DYP and DYM respectively increase and decrease the Y value of the emotion parameter.

DXP: Tendency to get relaxed (variability of the X value to the positive direction on the emotion map)

DXM: Tendency to get worried (variability of the X value to the negative direction on the emotion map)

DYP: Tendency to get excited (variability of the Y value to the positive direction on the emotion map)

DYM: Tendency to get disinterested (variability of the Y value to the negative direction on the emotion map)

The parameter setter 113 updates the emotion parameter by adding or subtracting a value, among DXP, DXM, DYP, and DYM as the emotion change amounts, corresponding to the external stimulus to or from the current emotion parameter. For example, when the head 204 is petted, the robot 200 is caused to have a pseudo-emotion of being relaxed, and thus, the parameter setter 113 adds DXP to the X value of the emotion parameter. Conversely, when the head 204 is struck, the robot 200 is caused to have a pseudo-emotion of being worried, and thus, the parameter setter 113 subtracts DXM from the X value of the emotion parameter. Which emotion change amount is associated with the various external stimuli can be set freely. An example is given below.

The head 204 is petted (relaxed): X=X+DXP

The head 204 is struck (worried): X=X−DXM (these external stimuli can be detected by the touch sensor 211 of the head 204)

The torso 206 is petted (excited): Y=Y+DYP

The torso 206 is struck (disinterested): Y=Y−DYM (these external stimuli can be detected by the touch sensor 211 of the torso 206)

Held with head upward (pleased): X=X+DXP and Y=Y+DYP

Suspended with head downward (sad): X=X−DXM and Y=Y−DYM (these external stimuli can be detected by the touch sensor 211 and the acceleration sensor 212)

Spoken to in kind voice (peaceful): X=X+DXP and Y=Y−DYM

Yelled out in loud voice (upset): X=X−DXM and Y=Y+DYP (these external stimuli can be detected by the microphone 213)

The sensor unit 210 acquires a plurality of external stimuli of mutually different types by a plurality of sensors. Thus, the parameter setter 113 variously derives the emotion change amounts DXP, DXM, DYP, and DYM in accordance with each individual external stimulus of the plurality of external stimuli, and updates the emotion parameter in accordance with the derived emotion change amounts.

Specifically, when the X value of the emotion parameter is set to the maximum value of the emotion map 300 even once in one day, the parameter setter 113 adds 1 to DXP, and when the Y value of the emotion parameter is set to the maximum value of the emotion map 300 even once in one day, the parameter setter 113 adds 1 to DYP. Additionally, when the X value of the emotion parameter is set to the minimum value of the emotion map 300 even once in one day, the parameter setter 113 adds 1 to DXM, and when the Y value of the emotion parameter is set to the minimum value of the emotion map 300 even once in one day, the parameter setter 113 adds 1 to DYM.

As described above, the parameter setter 113 changes the emotion change amounts, DXP, DXM, DYP, and DYM in accordance with a condition based on whether the value of the emotion parameter reaches the maximum value or the minimum value of the emotion map 300. As an example, assume that all of the initial values of the various variables as the emotion change amounts are set to 10. The parameter setter 113 increases the various variables to a maximum of 20 by updating the emotion change amounts described above. Due to this updating processing, the emotion change amount, that is, the degree of change of emotion, changes.

For example, when only the head 204 is petted multiple times, only DXP as the emotion change amount increases and the other emotion change amounts do not change, and thus, the robot 200 develops a personality of having a tendency to be relaxed. When only the head 204 is struck multiple times, only DXM as the emotion change amount increases and the other emotion change amounts do not change, and thus, the robot 200 develops a personality of having a tendency to be worried. As described above, the parameter setter 113 changes the emotion change amount in accordance with various external stimuli.

(2) Personality Parameter

The personality parameter is a parameter expressing a pseudo-personality of the robot 200. The personality parameter includes a plurality of personality values that express degrees of mutually different personalities. The parameter setter 113 changes the emotion parameter in accordance with external stimuli detected by the sensor unit 210, to set the personality parameter based on the emotion parameter.

Specifically, the parameter setter 113 calculates four personality values based on (Equation 1) below. Specifically, a value obtained by subtracting 10 from DXP that expresses a tendency to be relaxed is set as a personality value (chipper), a value obtained by subtracting 10 from DXM that expresses a tendency to be worried is set as a personality value (shy), a value obtained by subtracting 10 from DYP that expresses a tendency to be excited is set as a personality value (active), and a value obtained by subtracting 10 from DYM that expresses a tendency to be disinterested is set as a personality value (spoiled).

$$\text{Personality value (chipper)} = DXP - 10 \quad \text{(Equation 1)}$$

$$\text{Personality value (shy)} = DXM - 10$$

$$\text{Personality value (active)} = DYP - 10$$

$$\text{Personality value (spoiled)} = DYM - 10$$

Figure 5:
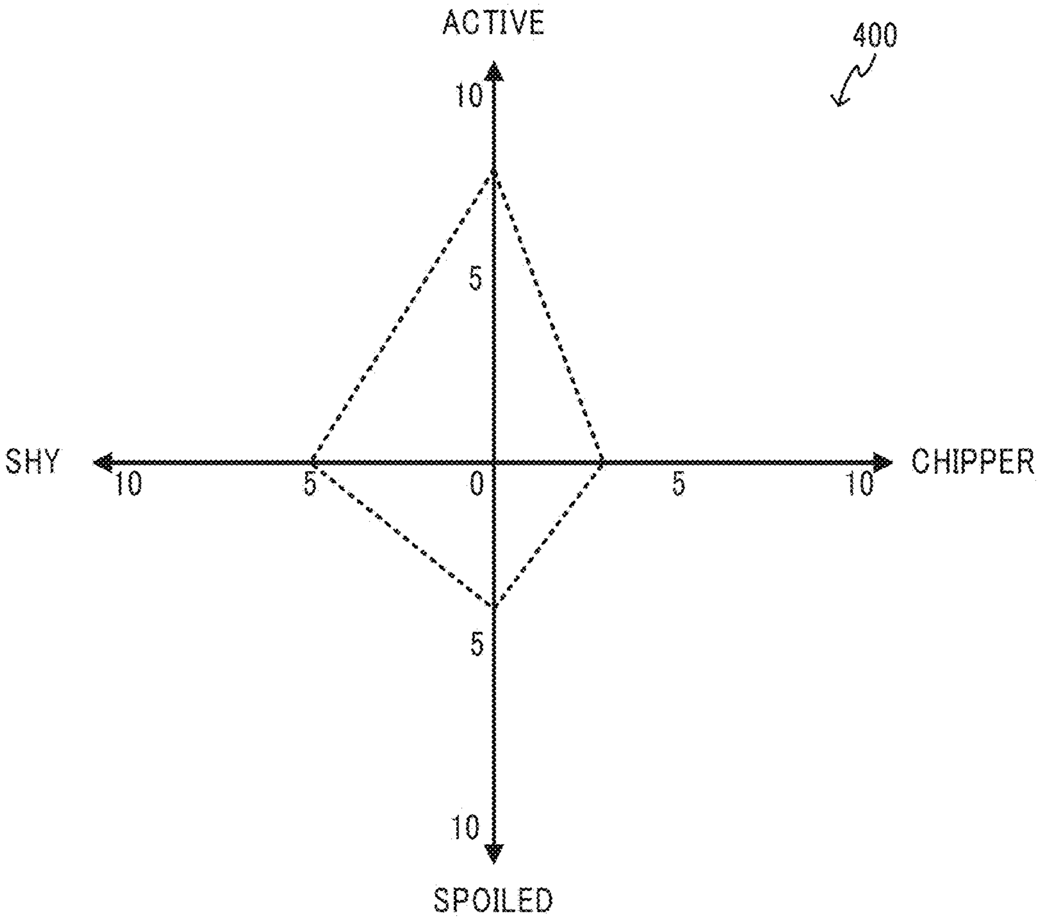
FIG. 5 is a drawing illustrating an example of a personality value radar chart according to Embodiment 1.

As a result, as illustrated in FIG. 5, a personality value radar chart 400 can be generated by plotting each of the personality value (chipper) on a first axis, the personality value (active) on a second axis, the personality value (shy) on a third axis, and the personality value (spoiled) on a fourth axis. Since the various variables as the emotion change amounts each have an initial value of 10 and increase up to 20, the range of the personality value is from 0 to 10.

Since the initial value of each of the personality values is 0, the personality at the time of birth of the robot 200 is expressed by the origin of the personality value radar chart 400. Moreover, as the robot 200 grows, the four personality values change, with an upper limit of 10, due to external stimuli and the like (manner in which the user interacts with the robot 200) detected by the sensor unit 210. Therefore, 11 to the power of 4, that is, 14641 types of personalities can be expressed. Thus, the robot 200 is to have various personalities in accordance with the manner in which the user interacts with the robot 200. That is, the personality of each individual robot 200 is formed differently based on the manner in which the user interacts with the robot 200.

These four personality values are fixed when the juvenile period elapses and the pseudo-growth of the robot 200 is complete. In the subsequent adult period, the parameter setter 113 adjusts four personality correction values (chipper correction value, active correction value, shy correction value, and spoiled correction value) in order to correct the personality in accordance with the manner in which the user interacts with the robot 200.

The parameter setter 113 adjusts the four personality correction values in accordance with a condition based on where the area in which the emotion parameter has existed the longest is located on the emotion map 300. Specifically, the four personality correction values are adjusted as in (A) to (E) below.

(A) When the longest existing area is the relaxed area on the emotion map 300, the parameter setter 113 adds 1 to the chipper correction value and subtracts 1 from the shy correction value.

(B) When the longest existing area is the excited area on the emotion map 300, the parameter setter 113 adds 1 to the active correction value and subtracts 1 from the spoiled correction value.

(C) When the longest existing area is the worried area on the emotion map 300, the parameter setter 113 adds 1 to the shy correction value and subtracts 1 from the chipper correction value.

(D) When the longest existing area is the disinterested area on the emotion map 300, the parameter setter 113 adds 1 to the spoiled correction value and subtracts 1 from the active correction value.

(E) When the longest existing area is the center area on the emotion map 300, the parameter setter 113 reduces the absolute value of all four of the personality correction values by 1.

When setting the four personality correction values, the parameter setter 113 calculates the four personality values in accordance with (Equation 2) below.

$$\text{Personality value (chipper)} = DXP - 10 + \text{chipper correction value} \quad \text{(Equation 2)}$$

$$\text{Personality value (shy)} = DXM - 10 + \text{shy correction value}$$

$$\text{Personality value (active)} = DYP - 10 + \text{active correction value}$$

$$\text{Personality value (spoiled)} = DYM - 10 + \text{spoiled correction value}$$

(3) Growth Days Count

The growth days count represents the number of days of pseudo-growth of the robot 200. The robot 200 is pseudo-born at the time of first start up by the user after shipping from the factory, and grows from a juvenile to an adult over a predetermined growth period. The growth days count corresponds to the number of days since the pseudo-birth of the robot 200.

An initial value of the growth days count is 1, and the state parameter acquirer 112 adds 1 to the growth days count for each passing day. In one example, the growth period in which the robot 200 grows from a juvenile to an adult is 50 days, and the 50-day period that is the growth days count since the pseudo-birth is referred to as a "juvenile period". When the juvenile period elapses, the pseudo-growth of the robot 200 is complete. A period after the completion of the juvenile period is called an "adult period".

During the juvenile period, each time the pseudo-growth days count of the robot 200 increases one day, the state parameter acquirer 112 increases the maximum value and the minimum value of the emotion map 300 both by 2. Regarding initial values of the size of the emotion map 300, as illustrated by a frame 301 of FIG. 4, a maximum value of both the X value and the Y value is 100 and a minimum value is −100. At a timing when the growth days count exceeds half of the juvenile period (for example, 25 days), as illustrated by a frame 302 of FIG. 4, the maximum value of the X value and the Y value is 150 and the minimum value is −150. When the juvenile period elapses, the pseudo-growth of the robot 200 stops. At this timing, as illustrated by a frame 303 of FIG. 4, the maximum value of the X value and the Y value is 200 and the minimum value is −200. Thereafter, the size of the emotion map 300 is fixed.

The emotion map 300 defines a settable range of the emotion parameter. Thus, as the size of the emotion map 300 expands, the settable range of the emotion parameter expands. Due to the expansion of the settable range of the emotion parameter, richer emotion expression becomes possible, and thus, the pseudo-growth of the robot 200 is expressed by the expansion of the size of the emotion map 300.

(4) Growth Level

The growth level represents the degree of pseudo-growth of the robot 200. The parameter setter 113 sets the growth level based on the personality parameter. Specifically, the growth level is 0 at the pseudo-birth of the robot 200. The parameter setter 113 then increases the growth level by one in one to several days. In this way, the parameter setter 113 increases the growth level to a maximum of 10 during the juvenile period (for example, 50 days from the pseudo-birth.) The parameter setter 113 stops the increase of the growth level when the juvenile period ends.

Specifically, the parameter setter 113 sets the growth level to the largest value among the plurality of personality values (four in the example described above) included in the personality parameter. For example, in the example of FIG. 5, the personality value (chipper) is 3, the personality value (active) is 8, the personality value (shy) is 5, and the personality value (spoiled) is 4. As such, the parameter setter 113 sets, as the growth level, the value 8 of the personality value (active), that is the maximum value among these personality values. Note that the growth level is not limited to the maximum value, and a configuration is possible in which a total value, an average value, a mode value, or the like of the plurality of personality values is used as the growth level.

The personality parameter changes depending on the manner in which the user interacts with the robot 200 and, as such, by setting the growth level based on the personality parameter, an effect of the robot 200 pseudo-growing based on the manner in which the user interacts with the robot 200 can be obtained.

Returning to FIG. 3, the action controller 115 causes the robot 200 to execute various actions based on the parameter data 121 set by the parameter setter 113. Here, the action that the action controller 115 causes the robot 200 to execute corresponds to at least one of controlling the driver 220 to cause the robot 200 to execute various motions, and controlling the outputter 230 to cause the robot 200 to output various sounds such as animal sounds or the like.

The action controller 115 determines whether any action trigger among a plurality of predetermined action triggers is satisfied. In a case where any action trigger is satisfied, the action controller 115 causes the robot 200 to execute an action corresponding to the satisfied action trigger. The action trigger is a condition for the robot 200 to act. Examples of the action trigger include triggers based on the external stimuli detected by the sensor unit 210, and triggers not based on the external stimuli.

Examples of the action trigger include "there is a loud sound", "spoken to", "petted", "rocked", "held", "struck", "scolded", "turned upside down", "became brighter", "became darker", and the like. These action triggers are triggers based on external stimuli and are detected by the sensor unit 210. In one example, the action triggers, "spoken to" and "scolded" are detected by the microphone 213. The action triggers, "petted" and "struck" are detected by the touch sensor 211 provided on the head 204 or the torso 206. The action triggers, "rocked", "held", and "turned upside down" are detected by the acceleration sensor 212 or the gyrosensor 215. The action triggers, "became brighter" and "became darker" are detected by the illuminance sensor 214. Alternatively, the action triggers may be action triggers that are not based on external stimuli, such as "a specific time arrived" or "the robot 200 moved to a specific location".

More specifically, in a case where a relatively small sound is detected by the microphone 213, the action controller 115 determines that the robot 200 is "spoken to", and in a case where a relatively loud sound is detected by the microphone 213, the action controller 115 determines that the robot 200 is "scolded". Additionally, in a case where a relatively small value is detected by the touch sensor 211, the action controller 115 determines that the robot 200 is "petted", and in a case where a relatively large value is detected by the touch sensor 211, the action controller 115 determines that the robot 200 is "struck". Further, the action controller 115 determines whether the robot 200 is "rocked", "held", or "suspended" based on detection values of the acceleration sensor 212 or the gyrosensor 215.

The action controller 115 determines, based on the result of detection performed by the sensor unit 210 and the like, whether any action trigger among the plurality of predetermined action triggers is satisfied. In a case where, as a result of the determination, any action trigger is satisfied, the robot 200 is caused to execute an action corresponding to the satisfied action trigger. The action controller 115 causes the robot 200 to execute various actions in accordance with satisfaction of action trigger. This allows the user and the robot 200 to interact with each other, for example, executing a purring action in response to a call from the user, executing a pleased action when petted by the user, executing an unwilling action when turned upside down by the user, and the like.

In a case where, any action trigger is satisfied, the action controller 115 causes the robot 200 to execute an action selected, from a selection candidate list corresponding to the satisfied action trigger, at a probability dependent on the growth level. The growth level is a degree of pseudo-growth of the robot 200. The action controller 115 references the action selection table 123 that is stored in the storage 120, for selecting an action that the action controller 115 causes the robot 200 to execute.

Figure 6:
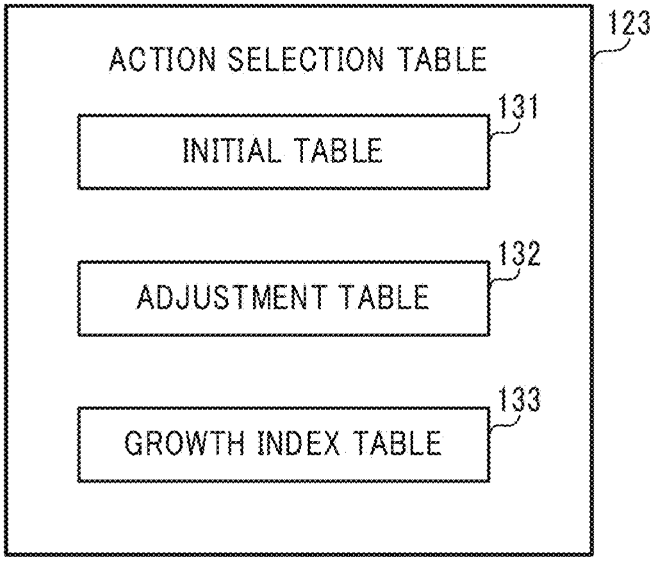
FIG. 6 is a drawing illustrating a configuration of an action selection table according to Embodiment 1.

The action selection table 123 is data that defines, for each of action triggers, options for actions to be executed by the robot 200 in a case where a corresponding action trigger is satisfied, and selection probabilities that the respective actions of the options are selected. Specifically, as illustrated in FIG. 6, the action selection table 123 includes three tables, that is, the initial table 131, the growth index table 133, and the adjustment table 132.

As illustrated in FIG. 7, the initial table 131 defines a selection candidate list including options for actions to be executed by the robot 200 in a case where a corresponding action trigger is satisfied. In the example of FIG. 7, the selection candidate list corresponding to the action trigger of "petted" defines five actions, as options, that is, the basic action 0-0 to the basic action 0-3, and personality action 0-0. Further, the selection candidate list corresponding to the action trigger of "spoken to" defines three actions, as options, that is, the basic action 1-0, the basic action 1-1, and the personality action 1-0.

Here, the basic action is dependent on the pseudo-growth of the robot 200, but is non-dependent on the pseudo-personality of the robot 200. In other words, the basic action is an action that does not change by the manner in which the user interacts with (takes care of) the robot 200. In contrast, the personality action is an action that is dependent on both the pseudo-growth and the pseudo-personality of the robot 200. In other words, the personality action is an action that changes by the manner in which the user interacts with (takes care of) the robot 200.

The initial table 131 defines, for each action in the selection candidate list defined for an action trigger, a selection probability to be selected upon satisfaction of the corresponding action trigger, in accordance with the growth level of the robot 200. In the example of FIG. 7, in a case where the action trigger of "petted" is satisfied, the selection probability of the basic action 0-0 is defined as 100% and the selection probabilities of the other actions are defined as 0% at the growth level of 0. At the growth level of 5, the selection probabilities of the basic action 0-0 to the basic action 0-3 and personality action 0-0 are respectively defined as 30%, 50%, 20%, 0%, and 0%. At the growth level of 10, the selection probabilities of the basic action 0-0 to the basic action 0-3 and personality action 0-0 are respectively defined as 10%, 10%, 20%, 20%, and 40%.

As described above, the initial table 131 defines the selection probability such that the probability of the basic action being selected while the growth level is small is high, and the probability of the personality action being selected increases as the growth level increases. Additionally, the initial table 131 defines the selection probability such that the types of selectable basic actions increase as the growth level increases. This results in having variations in action details executed by the robot 200 as the growth level of the robot 200 increases.

Here, the selection probability of each action defined in the initial table 131 is an initial value (default value) that is a value in a case where the selection probability is not adjusted by the selection probability adjuster 117 described below. That is, the initial table 131 sets, for each action in the selection candidate list corresponding to an action trigger, an initial value of the selection probability in accordance with the growth level. In the case where the selection probability is not adjusted by the selection probability adjuster 117, the action controller 115 selects the action to be executed by the robot 200 in accordance with the selection probability defined in the initial table 131 described above.

A specific example is described in which the microphone 213 detects a loud sound. In this case, the action trigger of "there is a loud sound" is satisfied. In the initial table 131 illustrated in FIG. 7, with reference to the selection probabilities associated with the action trigger of "there is a loud sound", the selection probability of the basic action 2-0 is 100% and the selection probabilities of the other actions are 0% at the growth level of 0. Therefore, at the growth level of 0, the action controller 115 selects the basic action 2-0 at a probability of 100%.

At the growth level of 1, the selection probability of the basic action 2-0 is 90% and the selection probability of the basic action 2-1 is 10%. Therefore, at the growth level of 1, the action controller 115 selects the basic action 2-0 at a probability of 90% and selects the basic action 2-1 at a probability of 10%. At the growth level of 2, the selection probability of the basic action 2-0 is 80% and the selection probability of the basic action 2-1 is 20%. Therefore, at the growth level of 2, the action controller 115 selects the basic action 2-0 at a probability of 80% and selects the basic action 2-1 at a probability of 20%.

For example, as illustrated in FIG. 5, as the current personality value of the robot 200, if the personality value (chipper) is 3, the personality value (active) is 8, the personality value (shy) is 5, and the personality value (spoiled) is 4, the growth level is 8, which is the maximum value of the four personality values. At the growth level of 8, the selection probability of the basic action 2-0 is 20%, the selection probability of the basic action 2-1 is 20%, the selection probability of the basic action 2-2 is 40%, and the selection probability of the personality action 2-0 is 20%. Therefore, at the growth level of 8, the action controller 115 selects the basic action 2-0, the basic action 2-1, and the personality action 2-0 each at a probability of 20% and selects the basic action 2-2 at a probability of 40%.

Upon the basic action or the personality action being selected in this manner, the action controller 115 references the action content table 124 and the motion table 125 and causes the robot 200 to execute the action of the content corresponding to the selected basic action or personality action.

As illustrated in FIG. 8, the action content table 124 is a table that defines the specific action content of each action. Additionally, the action content table 124 individually defines the action content of the personality actions for the four types of personality values (chipper, active, shy, and spoiled). In a case where "personality action 2-0" is selected, the action controller 115 further selects one of the four types of personality actions in accordance with the four personality values.

The action controller 115 calculates, as the selection probability of each personality action, a value obtained by dividing the personality value corresponding to that personality action by the total value of the four personality values. For example, in a case where the personality value (chipper) is 3, the personality value (active) is 8, the personality value (shy) is 5, and the personality value (spoiled) is 4, the total value of these is 3+8+5+4=20. In this case, the action controller 115 selects the personality action of "chipper" at a probability of 3/20=15%, the personality action of "active" at a probability of 8/20=40%, the personality action of "shy" at a probability of 5/20=25%, and the personality action of "spoiled" at a probability of 4/20=20%.

As illustrated in FIG. 9, the motion table 125 is a table that defines, for each action defined in the initial table 131, the manner in which the action controller 115 controls the twist motor 221 and the vertical motor 222. Specifically, the motion table 125 defines, for every action, each of an action time (ms), an action angle of the twist motor 221 after the action time, and an action angle of the vertical motor 222 after the action time. Furthermore, the motion table 125 defines, for every action, sound data to be output from the speaker 231.

For example, in a case where the basic action 2-0 is selected, the action controller 115 firstly controls so that, after 100 ms, the angles of the twist motor 221 and the vertical motor 222 are 0 degrees, and controls so that, after 100 ms thereafter, the angle of the vertical motor 222 is −24 degrees. Then, the action controller 115 does not rotate for 700 ms thereafter, and then controls so that, after 500 ms, the angle of the twist motor 221 is 34 degrees and the angle of the vertical motor 222 is −24 degrees. Then, the action controller 115 controls so that, after 400 ms, the angle of the twist motor 221 is −34 degrees and then controls so that, after 500 ms, the angles of the twist motor 221 and the vertical motor 222 are 0 degrees, thereby completing the action of the basic action 2-0. Additionally, in parallel with the driving of the twist motor 221 and the vertical motor 222, the action controller 115 plays an animal sound of an abrupt whistle from the speaker 231 based on sound data of an abrupt whistle sound.

In this way, the action controller 115 causes the robot 200 to execute the action that is dependent on the pseudo-growth of the robot 200. With real living creatures as well, actions such as behaviors, voices, and the like differ for juveniles and adults. For example, with a real living creature, a juvenile acts wildly and speaks with a high-pitched voice, but that wild behavior diminishes and the voice becomes deeper when that real living creature becomes an adult. The action controller 115 expresses differences in the actions in accordance with growth of the living creature.

Returning to FIG. 3, the selection probability adjuster 117 changes the selection probability that the action is selected from the selection candidate list in a case where the sensor unit 210 detects an external stimulus during a period from when the action controller 115 causes the robot 200 to execute the action until an elapse of the predetermined time. As described above, the value of the selection probability defined for each action in the initial table 131 illustrated in FIG. 7 corresponds to the initial value of the selection probability. The selection probability adjuster 117 changes the selection probability that the action is subsequently selected, from the initial value, based on the external stimulus detected by the sensor unit 210 when the robot 200 executes the action.

Specifically, the selection probability adjuster 117 determines whether the external stimulus is detected by the sensor unit 210 during a period from when the action controller 115 causes the robot 200 to execute the action until the elapse of the predetermined time. Here, the period from when the action controller 115 causes the robot 200 to execute the action until the elapse of the predetermined time corresponds to a period from a point at which the robot 200 starts the action until an elapse of the predetermined time. In other words, the period from when the action controller 115 causes the robot 200 to execute the action until the elapse of the predetermined time includes not only a point at which the robot 200 ends the action, but also includes a point at which the robot 200 is executing the action. The predetermined time is a time taken for confirmation of a reaction by a user to the action after the robot 200 executes the action. The predetermined time is, for example, the length of time, such as 10 seconds, 30 seconds, 1 minute, or the like.

Specifically, in a case where the external stimulus is detected in the period from when the robot 200 executes the action until the elapse of the predetermined time, the selection probability adjuster 117 determines whether the external stimulus is an external stimulus of first type, an external stimulus of second type, or an external stimulus of other type. To achieve this, the selection probability adjuster 117 references the classification table 127 stored in the storage 120.

As illustrated in FIG. 10, the classification table 127 classifies external stimuli that may be detected by the sensor unit 210 into first type, second type, and other type. The external stimulus of first type is a stimulus detected when the user demonstrates a positive response to an action executed by the robot 200. Examples of the external stimulus of first type include "praised", "petted", "rocked gently", "held", and the like. Conversely, the external stimulus of second type is a stimulus detected when the user demonstrates a negative response to an action executed by the robot 200. Examples of the external stimulus of second type include "scolded", "struck", "rocked forcefully", "turned upside down", and the like. The external stimulus of other type is an external stimulus other than the external stimuli of first type and the external stimuli of second type described above. Examples of the external stimulus of other type include "became brighter", "became darker", "a specific time arrived", "moved to a specific location", and the like.

In a case where the external stimulus is detected during a period from when the robot 200 executes the action until the elapse of the predetermined time, the selection probability adjuster 117 references the classification table 127 and determines the type of the detected external stimulus.

Specifically, in a case where a sound is detected by the microphone 213, the selection probability adjuster 117 performs sound recognition of the detected sound and determines whether the robot 200 is praised or scolded. Further, in a case where a contact on the head 204 or the torso 206 is detected by the touch sensor 211, the selection probability adjuster 117 determines whether the robot 200 is petted or struck, based on the strength of the detected contact. Furthermore, in a case where acceleration or angular velocity is detected by the acceleration sensor 212 or the gyrosensor 215, the selection probability adjuster 117 determines whether the robot is rocked gently, rocked forcefully, held, turned upside down, or the like, based on the detected acceleration or angular velocity. In this manner, the selection probability adjuster 117 determines whether the type of the external stimulus detected by the sensor unit 210 is the first type or the second type.

Further, if the type of the external stimulus detected by the sensor unit 210 is neither the first type nor the second type, such as a case where the illuminance sensor 214 detects being brighter or being darker, the selection probability adjuster 117 determines that the type of the detected external stimulus is other type.

In a case where an external stimulus of first type is detected during a period from when the action controller 115 causes the robot 200 to execute the action until the elapse of the predetermined time, the selection probability adjuster 117 increases the selection probability that the action is selected from the selection candidate list in a range less than or equal to the predetermined upper limit. In other words, if the user demonstrates a positive response such as petting, praising, or the like to the action executed by the robot 200, the selection probability adjuster 117 increases the selection probability that the action is selected thereafter from the initial value defined in the initial table 131.

This allows, for example, if the action executed by the robot 200 was a preferable action for the user, the robot 200 to execute that action more frequently by the user demonstrating a positive response to that action. As a result, the preferences of the user can be reflected to the action of the robot 200.

Here, the predetermined upper limit is a limiting value determined so that the selection probability does not deviate significantly from the initial value even if the selection probability adjuster 117 increases the selection probability. The predetermined upper limit is determined based on the initial value of the selection probability set for the action executed by the robot 200 in a case where the growth level is lower than the current growth level.

For example, in the initial table 131 illustrated in FIG. 7, the selection probability of the basic action 0-0 with the current value of the growth level being "6" is "20%". In this case, the predetermined upper limit for a case where the selection probability adjuster 117 increases the selection probability of the basic action 0-0 is set to "30%" at the growth level of "5", which is one level lower than the current growth level.

Note that, as the predetermined upper limit, not only the initial value of the selection probability at the growth level that is one level lower than the current growth level, but also the initial value of the selection probability at the growth level that two or more levels lower than the current growth level may be used. In the example of the basic action 0-0 above, in a case where the current value of the growth level is "6", the predetermined upper limit may be set to "80%" at the growth level of "3", which is three levels lower than the current growth level. Thus, how the initial value is used as the predetermined upper limit, and how low the growth level is from the current growth level can be determined any way. As one example, a case where the initial value of the selection probability at the growth level that one level lower than the current growth level is used as the predetermined upper limit is described below.

Specifically, in a case where an external stimulus of first type is detected during a period from when the action controller 115 causes the robot 200 to execute the action until the elapse of the predetermined time, the selection probability adjuster 117 compares, in the selection candidate list corresponding to the satisfied action trigger in the initial table 131, the probability set for that action at the current growth level with the selection probability set for that action at a growth level that is one level prior to the current growth level. Then, the selection probability adjuster 117 determines whether the selection probability, that is set in the initial table 131 for the action executed by the robot 200, at the current growth level is less than the selection probability at the growth level that is one level prior to the current growth level. In other words, the selection probability adjuster 117 determines whether the initial value of the selection probability at the current growth level is less than the initial value of the selection probability at the growth level that is one level prior to the current growth level.

As a result of the determination, (i) if the selection probability at the current growth level is less than the selection probability at the growth level that is one level prior to the current growth level, the selection probability adjuster 117 increases the selection probability that the action executed by the robot 200 is selected from the selection candidate list, with the selection probability at the growth level that is one level prior to the current growth level being the predetermined upper limit. Conversely, (ii) if the selection probability at the current growth level is greater than or equal to the selection probability at the growth level that is one level prior to the current growth level, the selection probability adjuster 117 determines that the selection probability at the current growth level is the upper limit, and does not increase the selection probability that the action executed by the robot 200 is selected from the selection candidate list.

A specific example is described in which the action trigger of "there is a loud sound" is satisfied at the current growth level of 8. In this case, the action controller 115 references the initial table 131 illustrated in FIG. 7, and selects the basic action 2-0 at the probability of 20%, the basic action 2-1 at the probability of 20%, the basic action 2-2 at the probability of 40%, and the personality action 2-0 at the probability of 20%. The action controller 115 causes the robot 200 to execute any of the actions selected. In a case where the external stimulus of first type is detected during a period from execution of such action until the elapse of the predetermined time, the selection probability adjuster 117 references the initial table 131 and compares the selection probability of the action at the current growth level of 8, with the selection probability of the action at the growth level of 7, which is one level prior to the current growth level.

(i) A first example is described in which, in a case where the action controller 115 selects the basic action 2-0 to cause the robot 200 to execute the basic action 2-0, 20% that is the selection probability of the basic action 2-0 at the growth level of 8 is less than 30% that is the selection probability of the basic action 2-0 at the growth level of 7 in the initial table 131. In this case, if the external stimulus of first type is detected in response to the execution of the basic action 2-0, the selection probability adjuster 117 sets the upper limit of the selection probability of the basic action 2-0 as 30% that is the selection probability at the growth level of 7. Thus, the selection probability adjuster 117 increases the selection probability of the basic action 2-0 at the growth level of 8 from 20% with the upper limit of 30%.

With reference to the adjustment table 132 illustrated in FIG. 11, the adjustment of the selection probability by the selection probability adjuster 117 is described in details. The adjustment table 132 illustrated in FIG. 11 shows an example of a case where the selection probabilities are not adjusted by the selection probability adjuster 117 at the growth levels of 0 to 7. Thus, the selection probabilities of each of the actions at the growth levels of 0 to 7 in the adjustment table 132 are the same as the corresponding selection probabilities in the initial table 131.

When the external stimulus of first type is detected by the sensor unit 210 upon execution of the basic action 2-0, the selection probability adjuster 117 increases the selection probability of the basic action 2-0 at the growth level of 8 by a predetermined increase value $\Delta P$. The increase value $\Delta P$ may be any value such as 0.1%, 0.5%, 1%, or the like. In the example below, the increase value $\Delta P$ is 0.3%. As in the adjustment table 132 illustrated in FIG. 11, the selection probability adjuster 117 increases, with respect to the action trigger of "there is a loud sound", the selection probability of the basic action 2-0 at the growth level of 8 from 20% to 20.3%.

The selection probability adjuster 117 increases the selection probability of the action executed by the robot 200 as above and also decreases the selection probabilities that actions other than the action executed by the robot 200 are selected from the selection candidate list. Specifically, the selection probability adjuster 117 decreases, with respect to the action trigger of "there is a loud sound", the selection probabilities of the basic action 2-1, the basic action 2-2, and the personality action 2-0, which are the actions other than the basic action 2-0, in the selection probability list.

More specifically, the selection probability adjuster 117 determines the decrease value of the selection probability of each of the basic action 2-1, the basic action 2-2, and the personality action 2-0 so that the sum of the adjusted selection probabilities of the actions is 100%. The selection probability adjuster 117 assigns the increase value ΔP of the selection probability of the basic action 2-0 equally to the basic action 2-1, the basic action 2-2, and the personality action 2-0 to determine the decrease value of the selection probability of each action as ΔP/3. Then, the selection probability adjuster 117 decreases the selection probabilities of the basic action 2-1, the basic action 2-2, and the personality action 2-0 by the determined decrease value ΔP/3. In the example of the adjustment table 132 illustrated in FIG. 11, the selection probability adjuster 117 decreases the selection probability of each of the basic action 2-1, the basic action 2-2, and the personality action 2-0 at the growth level of 8 by 0.1%.

As described above, each time the external stimulus of first type to the basic action 2-0 is detected, the selection probability adjuster 117 increases the selection probability of the basic action 2-0 by the increase value ΔP=0.3% and decreases the selection probabilities of the basic action 2-1, the basic action 2-2, and the personality action 2-0 by the decrease value ΔP/3=0.1%. As a result, it can increase the probability that the robot 200 executes the basic action 2-0 in a case where the action trigger of "there is a loud sound" is satisfied in future while maintaining the sum of the selection probabilities of the actions included in a selection candidate list corresponding to one action trigger at 100%.

Note that if there is an action of which selection probability is 0% among actions of which selection probabilities are to be decreased, the selection probability of that action cannot be decreased. In this case, the selection probability adjuster 117 determines the decrease value by equally assigning the increase value ΔP to at least one action other than the action of which selection probability is 0%, and decreases the selection probability of the at least one action other than the action of which selection probability is 0%. Further, if any of the selection probabilities of actions becomes a negative value after equally assigning the increase value ΔP, the selection probability adjuster 117 adjusts the decrease value so that none of the selection probabilities becomes a negative value. Thus, within a constraint that the sum of selection probabilities of actions included in a selection candidate list corresponding to one action trigger is maintained at 100% and none of the selection probabilities of the actions is a negative value, the selection probability adjuster 117 decreases the selection probability that each of actions other than the action executed by the robot 200 is selected from the selection candidate list.

(ii) A second example is described in which, in a case where the action controller 115 selects the basic action 2-2 to cause the robot 200 to execute the basic action 2-2, 40% that is the selection probability of the basic action 2-2 at the growth level of 8 is greater than 20% that is the selection probability of the basic action 2-2 at the growth level of 7 in the initial table 131. In this case, if the external stimulus of first type is detected in response to the execution of the basic action 2-2, the selection probability adjuster 117 sets the upper limit of the selection probability of the basic action 2-2 as 40% that is the selection probability at the current growth level of 8. As such, the selection probability adjuster 117 maintains the selection probability of the basic action 2-2 at the growth level of 8 at 40% and does not increase the selection probability.

As above, with respect to the selection probability of the action executed by the robot 200, the selection probability adjuster 117, while increasing the selection probability of the action in a case where the selection probability at the current growth level is less than the selection probability at the previous growth level, does not increase the selection probability of the action in a case where the selection probability at the current growth level is greater than the selection probability at the previous growth level. In this way, among the actions frequently executed by the robot 200 when the growth level is low, that is, in younger days, the probability of action that the user likes can be maintained even after the robot 200 is grown up.

Returning to FIG. 6, the growth index table 133 of the action selection table 123 is a table indicating a change value for changing the selection probability of each action in a case where the growth level of the robot 200 increases. Specifically, as illustrated in FIG. 12, the growth index table 133 defines the change value (increase value or decrease value) of selection probability for a case where the value of the growth level increases by 1 only, for each action in the selection candidate list defined for an action trigger.

For example, in a case where the action trigger of "petted" is satisfied, upon increase of the growth level from 1 to 2, the selection probability of the basic action 0-0 decreases from 100% to 80% and the selection probability of the basic action 0-1 increases from 0% to 20%. Thus, the growth index table 133 defines, at the growth level of 1 with respect to the action trigger of "petted", the growth index of the basic action 0-0 as −20% and the growth index of the basic action 0-1 as +20%.

As the growth level is increased by the parameter setter 113, the selection probability adjuster 117 updates the adjustment table 132 based on the growth index of each action defined in the growth index table 133. Specifically, in a case where the growth level increases from n to n+1, the selection probability adjuster 117 adds, to the selection probability of each action of which the growth level is defined as n in the adjustment table 132, the growth index of the corresponding action of which the growth level is defined as n in the growth index table 133.

For example, at the growth level of 1 in the growth index table 133, the growth index of the basic action 0-0 is defined as −20% and the growth index of the basic action 0-1 is defined as +20%. Thus, in a case where the growth level increases from 1 to 2, the selection probability adjuster 117 subtracts 20% from 100% that is the selection probability of the basic action 0-0 at the growth level of 1 to calculate the selection probability of the basic action 0-0 at the growth level of 2 as 80% Further, the selection probability adjuster 117 adds 20% to 0% that is the selection probability of the basic action 0-1 at the growth level of 1 to calculate the selection probability of the basic action 0-1 at the growth level of 2 as 20%

In a case where the growth level increases from n to n+1, the selection probability adjuster 117 calculates the selection probability of each action at the growth level of n+1 as above. Then, the selection probability adjuster 117 updates the adjustment table 132 by inputting the value of the calculated selection probability to the column of the selection probability of each action at the growth level of n+1 in the adjustment table 132.

Specifically, even after the selection probability is changed from the initial value defined in the initial table 131, the selection probability adjuster 117 adds, to the selection probability of each action, the growth index defined in the growth index table 133 when the growth level increases. For example, the adjustment table 132 illustrated in FIG. 13 shows an example in which the selection probability of the basic action 2-0 at the growth level of 8 increases from 20%, which is the initial value, to 26%, and the selection probabilities of the basic action 2-1, the basic action 2-2, and the personality action 2-0 decrease to the corresponding values.

In a case where the growth level increases after increase or decrease of selection probability as above, the selection probability adjuster 117 adds the growth index defined for each action in the growth index table 133 to the selection probability that is after the increase or the decrease. In the example of FIG. 13, in a case where the growth level increases from 8 to 9 and further increases to 10, the selection probability adjuster 117 adds the growth indexes at the growth level of 8 and the growth level of 9 defined in the growth index table 133 to the selection probability that is after the increase or the decrease at the growth level of 8 in the adjustment table 132.

In this way, even after the selection probability of an action is increased or decreased due to the external stimulus of first type, the selection probability adjuster 117 changes, along with the increase of growth level, the selection probability of each action based on the initially-set growth index. This enables, in a case where the selection probability of an action changes due to the external stimulus of first type, the change of the selection probability to be taken over even after the pseudo-growth of the robot 200. Thus, even after the pseudo-growth of the robot 200, individuality can be imparted to the action to be executed by the robot 200.

Figure 14:
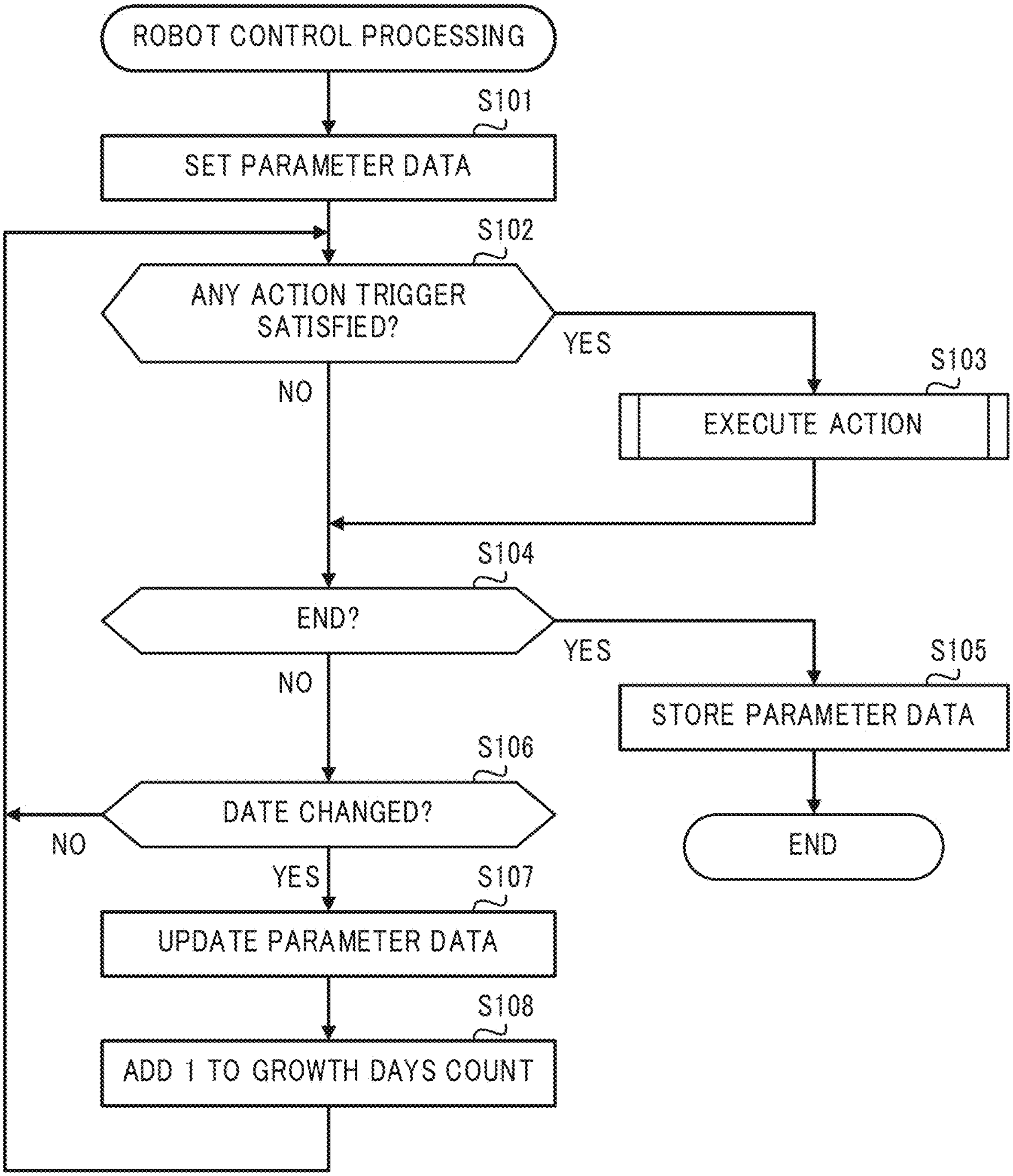
FIG. 14 is a flowchart illustrating robot control processing according to Embodiment 1.

Next, the flow of the robot control processing is described with reference to FIG. 14. The robot control processing illustrated in FIG. 14 is executed by the controller 110 of the control device 100, in response to the user turning on the power of the robot 200. The robot control processing is an example of a control method of the robot 200.

Upon starting the robot control processing, the controller 110 functions as the parameter setter 113 and sets the parameter data 121 (step S101). When the robot 200 is started up for the first time (the time of the first start up by the user after shipping from the factory), the controller 110 sets the various parameters, namely the emotion parameter, the personality parameter, the growth days count, and the growth level to initial values (for example, 0). Meanwhile, at the time of starting up for the second and subsequent times, the controller 110 reads the values of the various parameters stored in step S105, described later, of the robot control processing to set the parameter data 121. However, a configuration may be employed in which the values of the emotion parameter are all initialized to 0 each time the power is turned on.

Upon setting the parameter data 121, the controller 110 determines whether an action trigger of the plurality of action triggers is satisfied (step S102). In a case where the action trigger is satisfied (Yes in step S102), the controller 110 causes the robot 200 to execute the action corresponding to the satisfied action trigger (step S103). Details of the action control processing in step S103 are described with reference to the flowchart of FIG. 15.

Figure 15:
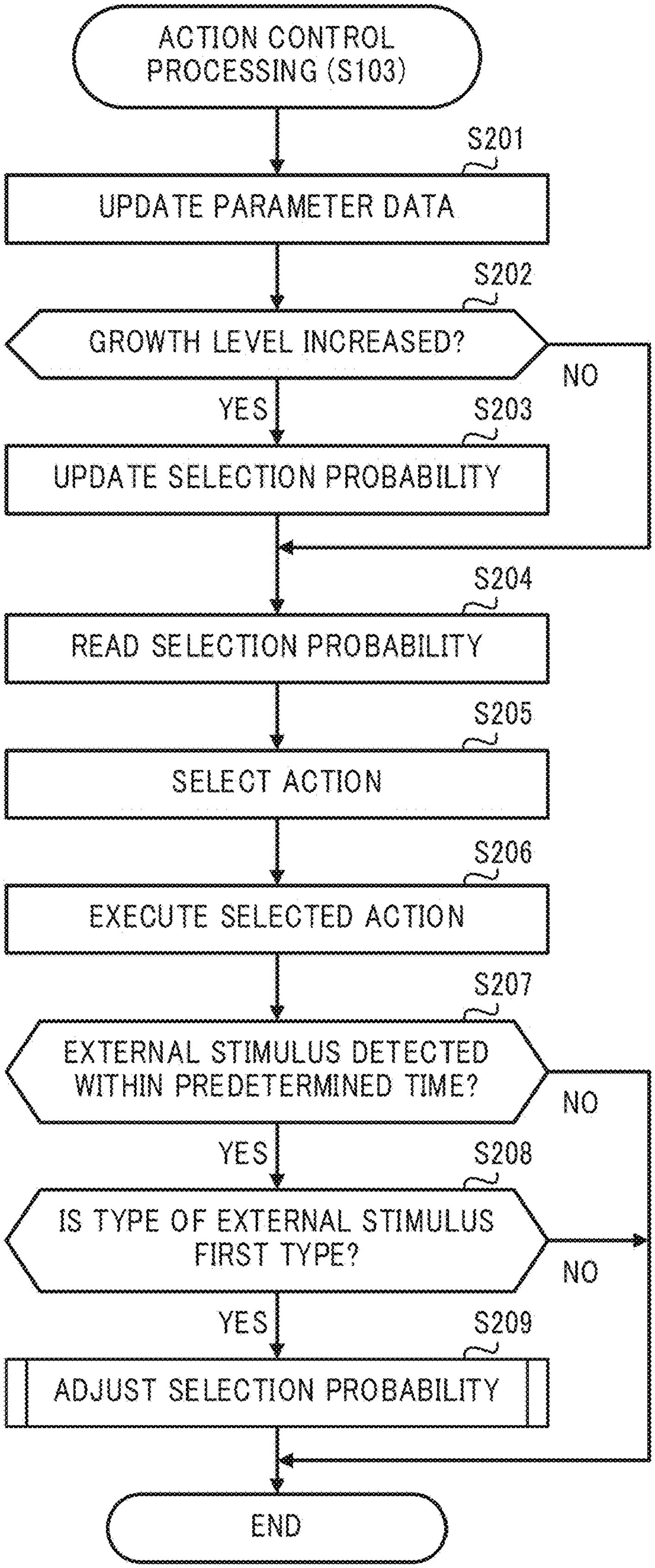
FIG. 15 is a flowchart illustrating action control processing according to Embodiment 1.

Upon starting the action control processing illustrated in FIG. 15, the controller 110 updates the emotion parameter, the personality parameter, and the growth level that are included in the parameter data 121 (step S201). Specifically, in a case where the action trigger satisfied in step S102 is based due to an external stimulus, the controller 110 derives the emotion change amount corresponding to that external stimulus. Then, the controller 110 adds or subtracts the derived emotion change amount to or from the current emotion parameter to update the emotion parameter. Furthermore, in the juvenile period, the controller 110 calculates, in accordance with (Equation 1) described above, the various personality values of the personality parameter from the emotion change amount updated in step S107. Meanwhile, in the adult period, the controller 110 calculates, in accordance with (Equation 2) described above, the various personality values of the personality parameter from the personality correction values and the emotion change amount updated in step S107. Further, the controller 110 updates the growth level by setting the maximum value among a plurality of personality values included in the personality parameter as a new growth level.

Upon updating the parameter data 121, the controller 110 determines whether the growth level updated in step S201 is increased from the growth level before the update (step S202). In a case where the growth level has increased (Yes in step S202), the controller 110 updates the selection probability in the adjustment table 132 (step S203). Specifically, the controller 110 adds, to the selection probability of each action at the growth level before increase in the adjustment table 132, the corresponding growth index defined in the growth index table 133. By doing so, the controller 110 updates the selection probability of each action at the current growth level in the adjustment table 132. In contrast, in a case where the growth level has not increased (No in step S202), the controller 110 skips the processing in step S203 and does not update the selection probability.

Next, the controller 110 references the adjustment table 132 and reads the selection probability that corresponds to the action trigger determined as being satisfied in step S102 and the current growth level action (step S204). Then, the controller 110 selects, based on the read selection probability, an action to be executed by the robot 200 using random numbers (step S205). For example, in the adjustment table 132 illustrated in FIG. 11, in a case where the current growth level is 8 and the action trigger is "there is a loud sound", the controller 110 selects the basic action 2-0 at a probability of 20.3%, the basic action 2-1 at a probability of 19.9%, the basic action 2-2 at a probability of 39.9%, and the personality action 2-0 at a probability of 19.9%. At this time, in a case where the personality action is selected as the action to be executed by the robot 200, the controller 110 calculates the selection probability of each personality based on the magnitudes of the four personality values. Then, the controller 110 selects, based on the calculated selection probability of each personality, the personality action using random numbers.

Then, upon selecting the action to be executed by the robot 200, the controller 110 causes the robot 200 to execute the selected action (step S206). Specifically, the controller 110 performs the motion and the sound output defined in the motion table 125 to cause the robot 200 to execute the action of the action content defined in the action content table 124.

Upon causing the robot 200 to execute the selected action, the controller 110 determines whether an external stimulus is detected by the sensor unit 210 within a predetermined time from the execution of the action (step S207). That is, the controller 110 determines whether a user response to the action executed by the robot 200 is detected during a period from when the robot 200 is caused to execute the action until the elapse of the predetermined time.

In a case where the external stimulus is detected within the predetermined time from the execution of the action (Yes in step S207), the controller 110 determines whether the type of the detected external stimulus is the first type (step S208). Specifically, the controller 110 references the classification table 127 illustrated in FIG. 10 and determines whether the type of the external stimulus detected in step S207 is the first type corresponding to the positive response to the action executed by the robot 200.

In a case where the type of the detected external stimulus is the first type (Yes in step S208), the controller 110 adjusts, based on the user response, the selection probabilities of the actions including the executed action (step S209). Details of the selection probability adjustment processing in step S209 are described with reference to the flowchart of FIG. 16.

Figure 16:
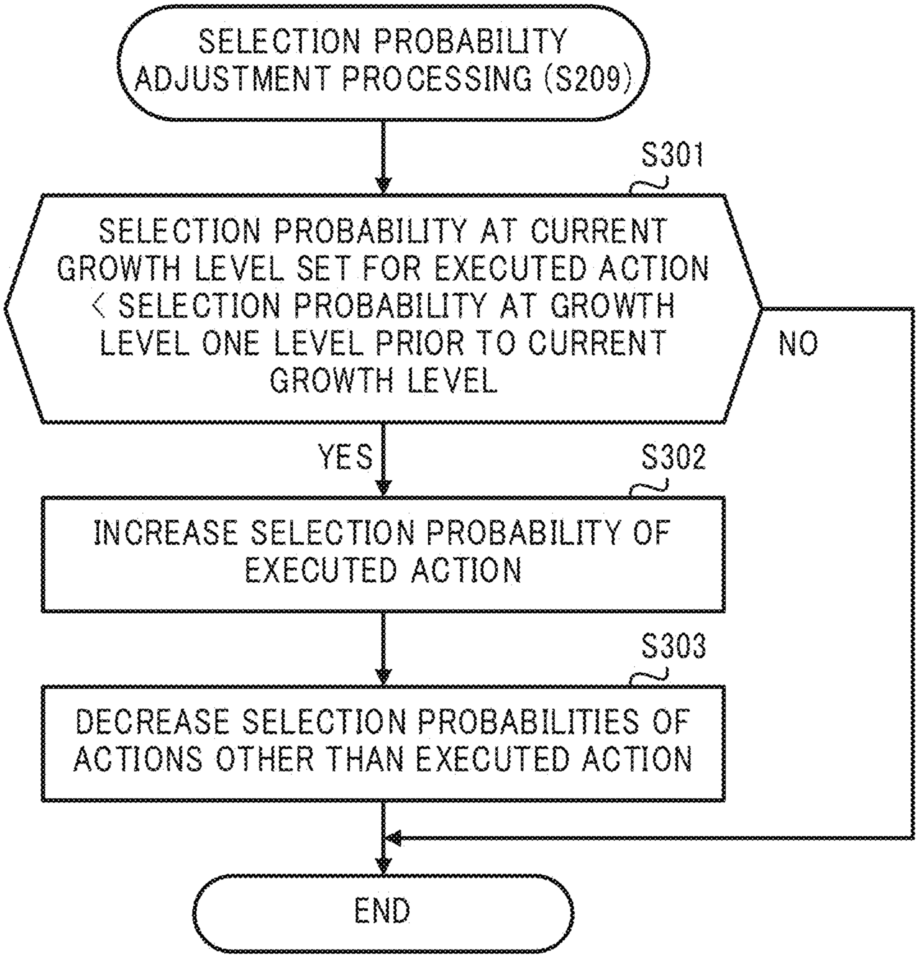
FIG. 16 is a flowchart illustrating selection probability adjustment processing according to Embodiment 1.

Upon starting the selection probability adjustment processing illustrated in FIG. 16, the controller 110 references the initial table 131 and determines whether the selection probability at the current growth level set for the action executed by the robot 200 is less than the selection probability at the growth level that is one level prior to the current growth level (step S301).

In a case where the selection probability at the current growth level is less than the selection probability at the growth level that is one level prior to the current growth level (Yes in step S301), the controller 110 increases, by the predetermined increase value ΔP, the selection probability of the action executed by the robot 200, in the selection candidate list corresponding to the action trigger satisfied in step S102, in the adjustment table 132 (step S302).

Then, the controller 110 decreases the selection probability of at least one action other than the action executed by the robot 200, in the selection candidate list corresponding to the action trigger satisfied in step S102, in the adjustment table 132 (step S303). Specifically, within a constraint that the sum of selection probabilities of actions included in a selection candidate list corresponding to one action trigger is maintained at 100% and none of the selection probabilities of the actions is a negative value, the controller 110 determines the decrease value and decreases the selection probability of at least one action of which selection probability is to be decreased.

In contrast, in a case where the selection probability at the current growth level is greater than or equal to the selection probability at the growth level that is one level prior to the current growth level (No in step S301), the controller 110 skips the processing in steps S302 and S303, and does not change the selection probability of each action. Thus, the selection probability adjustment processing illustrated in FIG. 16 ends.

Returning to FIG. 15, when the selection probability adjustment processing of step S209 is executed, the action control processing illustrated in FIG. 15 ends. In a case where the external stimulus is not detected within the predetermined time from the execution of the action (No in step S207), and in a case where the type of the detected external stimulus is not the first type (No in step S208), the controller 110 skips the processing in step S209.

Returning to FIG. 14, in a case where none of the action triggers is satisfied (No in step S102) or the action control processing illustrated in FIG. 15 is executed, the controller 110 determines whether to end the processing (step S104). For example, when the operational unit 240 receives from the user a command for turning off the power of the robot 200, the processing ends. In a case where the processing ends (Yes in step S104), the controller 110 stores the current parameter data 121 in a non-volatile memory (for example, flash memory) of the storage 120 (step S105), and ends the robot control processing illustrated in FIG. 14.

In a case where the processing does not end (No in step S104), the controller 110 uses the clock function to determine whether a date has changed (step S106). In a case where the date has not changed (No in step S106), the controller 110 returns the processing to the processing in step S102.

In contrast, in a case where the date has changed (Yes in step S106), the controller 110 updates the parameter data 121 (step S107). Specifically, in a case where it is during the juvenile period (for example, 50 days from birth), the controller 110 changes the values of the emotion change amounts DXP, DXM, DYP, and DYM in accordance with whether the emotion parameter has reached the maximum value or the minimum value of the emotion map 300. Additionally, in a case where it is during the juvenile period, the controller 110 increases both the maximum value and the minimum value of the emotion map 300 by a predetermined increase amount (for example, 2). In contrast, in a case where it is during the adult period, the controller 110 adjusts the personality correction values.

When the parameter data 121 is updated, the controller 110 adds 1 to the growth days count (step S108), and returns the processing to the processing in step S102. Then, as long as the robot 200 is operating normally, the controller 110 repeats the processing in steps S102 to S108.

As described above, the robot 200 according to Embodiment 1 executes, in a case where the predetermined action trigger is satisfied, the action selected, from the selection candidate list corresponding to the action trigger, at the selection probability that is dependent on the growth level of the robot 200, and changes, in a case where an external stimulus is detected during a period from the execution of the action until the elapse of the predetermined time, the selection probability that the action is selected from the selection candidate list. As such, the probability that the action executed by the robot 200 is selected in future changes due to the external stimulus such as the relationship with the user, and the like. Thus, the manner of pseudo-growth of the robot 200 is not uniform and individuality can be imparted to the manner of pseudo-growth of the robot 200. Therefore, the robot 200 according to Embodiment 1 can realistically simulate a living creature and can enhance lifelikeness.

In particular, in a case where an external stimulus of first type is detected during a period from the execution of the action until the elapse of the predetermined time, the robot 200 according to Embodiment 1 increases the selection probability that the action is selected from the selection candidate list in a range less than or equal to the predetermined upper limit. This allows, if the action executed by the robot 200 was a preferable action for the user, the probability that that action is selected in future can be increased by the user demonstrating a positive response such as praising, petting, or the like. Thus, in the robot 200 that executes the action in accordance with the growth level, the preferences of the user can be reflected to the action of the robot 200.

Embodiment 2

Next, Embodiment 2 is described. In Embodiment 2, as appropriate, descriptions of configurations and functions that are the same as those described in Embodiment 1 are forgone.

In Embodiment 1, in a case where the selection probabilities that actions other than the action executed by the robot 200 are selected from the selection candidate list are decreased, the selection probability adjuster 117 equally assigns the increase value ΔP to determine the decrease value of the selection probabilities that the actions are selected. In contrast, in Embodiment 2, the selection probability adjuster 117 determines, based on priorities preassigned to respective actions, the decrease value of the selection probabilities that the actions are selected.

FIG. 17 is a drawing illustrating an example of a priority table 128 according to Embodiment 2. The priority table 128 is stored in the storage 120. The priority table 128 preassigns the priorities to actions in the selection candidate list corresponding to each of the action triggers. In the example of FIG. 17, among the five actions in the selection candidate list corresponding to the action trigger of "petted", the priority of the basic action 0-0 is set to be the lowest, and the priority of the personality action 0-0 is set to be the highest. The higher the priority of an action, the more preferentially the selection probability of that action is reduced.

In a case where the sensor unit 210 detects an external stimulus of first type during a period from when the action controller 115 causes the robot 200 to execute the action until the elapse of the predetermined time, the selection probability adjuster 117 increases the selection probability that the action is selected from the selection candidate list. In addition, the selection probability adjuster 117 determines, in accordance with the priorities set in the priority table 128, the decrease value for decreasing the selection probabilities that actions other than the action executed by the robot 200 are selected and decreases the selection probabilities of the actions.

Specifically, within a constraint that the sum of selection probabilities of actions included in in a selection candidate list corresponding to one action trigger is maintained at 100% and none of the selection probabilities of the actions is a negative value, the selection probability adjuster 117 determines the decrease value of the selection probability of each action so that the higher the priority set in the priority table 128, the greater the decrease value. By setting the priority as above, the decrease value of the selection probability can be designed more flexibly than equally assigning the decrease value as in Embodiment 1.

Specifically, the priority table 128 illustrated in FIG. 17 sets a higher priority for a newly exhibited action that is exhibited newly as the growth level increases. Here, the newly exhibited action is an action of which a selection probability is 0% at the growth level of 0, but a selection probability greatly increases as the growth level increases. The examples of the newly exhibited action include a personality action. Therefore, the priority table 128 sets the priority of the personality action to be higher than that of the basic action. Further, the priority table 128 sets a higher priority to an action, among the basic actions, of which the selection probability greatly increases as the growth level increases.

As above, the newly exhibited action is assigned with a higher priority, and thus, the selection probability thereof is preferentially decreased. If the user desires to increase the selection probability of the newly exhibited action, the robot 200 may be grown. Conversely, if the user does not desire to increase the selection probability of the newly exhibited action, the user can decrease the selection probability of the action executed by the robot 200 preferentially by demonstrating a positive response to that action.

Embodiment 3

Next, Embodiment 3 is described. In Embodiment 3, as appropriate, descriptions of configurations and functions that are the same as those described in Embodiments 1 and 2 are forgone.

In Embodiments 1 and 2, in a case where an external stimulus of first type is detected during a period from when the action controller 115 causes the robot 200 to execute the action until the elapse of the predetermined time, the selection probability adjuster 117 increases the selection probability that the action is selected from the selection candidate list. Instead of or in addition to the above, in Embodiment 3, in a case where an external stimulus of second type is detected during a period from when the action controller 115 causes the robot 200 to execute the action until the elapse of the predetermined time, the selection probability adjuster 117 decrease the selection probability that the action is selected from the selection candidate list.

As described in Embodiment 1, the external stimulus of second type is a stimulus detected when the user demonstrates a negative response such as getting angry, striking, or the like to an action executed by the robot 200. In a case where the external stimulus is detected in the period from when the robot 200 executes the action until the elapse of the predetermined time, the selection probability adjuster 117 references the classification table 127 and determines whether the external stimulus is an external stimulus of first type, an external stimulus of second type, or an external stimulus of other type.

In a case where an external stimulus of second type is detected during a period from when the action controller 115 causes the robot 200 to execute the action until the elapse of the predetermined time, the selection probability adjuster 117 decrease the selection probability that the action is selected from the selection candidate list. In addition, the selection probability adjuster 117 increases, within a range less than or equal to the predetermined upper limit, the selection probability that at least one action other than the action is selected from the selection candidate list. As in Embodiment 1, the predetermined upper limit is set based on the initial value of the selection probability that is to the action executed by the robot 200 in a case where the growth level is one level lower than the current growth level.

Details of the processing by the selection probability adjuster 117 in Embodiment 3 can be explained in the same way as in Embodiment 1 by replacing "in a case where an external stimulus of first type is detected" described in Embodiment 1 with "in a case where an external stimulus of second type is detected" and by interchanging "increase" and "decrease" regarding the adjustment of selection probability described in Embodiment 1 with each other in Embodiment 3. However, the predetermined upper limit in Embodiment 3 is used when the selection probability of at least one action other than the action executed by the robot 200 increases, and not when the selection probability of the action executed by the robot 200 increases.

As above, with respect to the robot 200 according to Embodiment 3, the selection probability that the action is selected from the selection candidate list is decreased in a case where an external stimulus of second type is detected during a period from the execution of the action until the elapse of the predetermined time. This allows, if the action executed by the robot 200 was not a preferable action for the user, the robot 200 to execute that action less often in future by the user demonstrating a negative response to that action. As a result, the probability that the robot 200 executes the action preferred by the user increases, and thus, the preferences of the user can be reflected to the action of the robot 200.

MODIFIED EXAMPLES

Embodiments of the present disclosure are described above, but these embodiments are merely examples and do not limit the scope of application of the present disclosure. That is, the embodiment of the present disclosure may be variously modified, and any modified embodiments are included in the scope of the present disclosure.

For example, in the embodiments described above, the parameter setter 113 sets the emotion parameter and the personality parameter, and sets, as a growth level, the maximum value among the plurality of personality values included in the personality parameter. The growth level, however, is not limited to this, and may be set based on any criteria. For example, the growth level is not limited to be based on the personality parameter, and may be based directly on the growth days count.

If the growth level is set not based on the personality parameter, the parameter setter 113 may not necessarily set the personality parameter. Further, the parameter setter 113 may not necessarily set the emotion parameter for setting the personality parameter. Further, the emotion parameter and the personality parameter described in the embodiments above are merely an example. Even if the emotion parameter and the personality parameter are set, the emotion parameter and the personality parameter may be set using another method.

In the embodiments described above, the action selection table 123 defines actions for each of the action triggers as a selection candidate list. The actions are basic actions and/or personality actions. However, the actions to be executed by the robot 200 are not limited to the basic actions or the personality actions, and may be defined any way. Note that, in the embodiments described above, the personality action selected for each action trigger is one but, as with the basic actions, the type of personality action may be increased in accordance with increase of the personality values.

In the embodiments described above, the exterior 201 is formed in a barrel shape from the head 204 to the torso 206, and the robot 200 has a shape as if lying on its belly. However, the robot 200 is not limited to resembling a living creature that has a shape as if lying on its belly. For example, a configuration may be employed in which the robot 200 has a shape provided with arms and legs, and resembles a living creature that walks on four legs or two legs.

Although the above embodiments describe a configuration in which the control device 100 is installed in the robot 200, a configuration may be employed in which the control device 100 is not installed in the robot 200 but, rather, is a separated device (for example, a server). When the control device 100 is provided outside the robot 200, the control device 100 communicates with the robot 200 via the communicator 130, the control device 100 and the robot 200 send and receive data to and from each other, and the control device 100 controls the robot 200 as described in the embodiments described above.

In the embodiments described above, in the controller 110, the CPU executes the program stored in the ROM to function as the various components, namely the parameter setter 113, the action controller 115, and the selection probability adjuster 117. However, in the present disclosure, the controller 110 may include, for example, dedicated hardware such as an Application Specific Integrated Circuit (ASIC), a Field-Programmable Gate Array (FPGA), various control circuitry, or the like instead of the CPU, and this dedicated hardware may function as the various components, namely the parameter setter 113, the action controller 115, and the selection probability adjuster 117. In this case, the functions of each of the components may be achieved by individual pieces of hardware, or the functions of each of the components may be collectively achieved by a single piece of hardware. Furthermore, a part of the functions of the components may be implemented by dedicated hardware and another part thereof may be implemented by software or firmware.

It is possible to provide a robot provided in advance with the configurations for achieving the functions according to the present disclosure, but it is also possible to apply a program to cause an existing information processing device or the like to function as the robot according to the present disclosure. That is, applying a program for achieving each functional configuration of the robot 200 of the above embodiments so as to be executable by a CPU or the like that controls an existing information processing device or the like enables causing the existing information processing device or the like to function as the robot according to the present disclosure.

Additionally, any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the programs can be superimposed on a carrier wave and applied via a communication medium such as the Internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot configured to autonomously act, the robot comprising:

a sensor to detect an external stimulus;

a memory storing a table including priority data; and at least one processor, wherein:

the at least one processor:

causes, in response to a predetermined action trigger being satisfied, the robot to execute a selected action corresponding to the action trigger, the selected action being selected from among actions of a selection candidate list at a selection probability dependent on a growth level, and the growth level representing a degree of pseudo-growth of the robot;

increases, in response to the sensor detecting the external stimulus of a first classification during a period from when the robot is caused to execute the selected action until an elapse of a predetermined time, the selection probability that the selected action is selected from among the actions of the selection candidate list within a range less than or equal to a predetermined upper limit; and decreases, in response to increasing the selection probability that the selected action is selected from among the actions of the selection candidate list in accordance with detection of the external stimulus of the first classification, selection probabilities that actions other than the selected action are selected from among the actions of the selection candidate list, in the table including the priority data, each of the actions of the selection candidate list is stored in association with a predetermined priority used when the selection probability thereof is decreased, and for each of the actions, a decrease value of the selection probability that the action is selected is a predetermined value determined based on the predetermined priority stored in the table in association with the action.

2. The robot according to claim 1, wherein:

for each action in the selection candidate list, an initial value of the selection probability is set in accordance with the growth level, and the predetermined upper limit is defined based on the initial value that is set for the selected action executed by the robot in a case where the growth level is lower than a current growth level.

3. The robot according to claim 1, wherein the at least one processor, in response to the sensor detecting the external stimulus of the first classification during the period from when the robot is caused to execute the selected action until the elapse of the predetermined time:

in a case where the selection probability set for the selected action at a current growth level is less than or equal to the selection probability set for the selected action at a growth level lower than the current growth level, increases, with the predetermined upper limit, the selection probability that the selected action is selected from among the actions of the selection candidate list, the predetermined upper limit being a value of the selection probability set for the selected action at the growth level lower than the current growth level, and in a case where the selection probability set for the selected action at the current growth level is greater than the selection probability set for the selected action at the growth level lower than the current growth level, does not increase the selection probability that the selected action is selected from among the actions of the selection candidate list.

4. The robot according to claim 1, wherein in response to the sensor detecting the external stimulus of a second classification during the period from when the robot is caused to execute the selected action until the elapse of the predetermined time, the at least one processor decreases the selection probability that the selected action is selected from among the actions of the selection candidate list and increases a selection probability of at least one action other than the selected action from among the actions of the selection candidate list within a range less than or equal to the predetermined upper limit.

5. The robot according to claim 1, wherein the at least one processor sets a personality parameter expressing a pseudo-personality of the robot, and sets the growth level based on the personality parameter.

6. The robot according to claim 5, wherein:

the personality parameter includes personality values that express degrees of mutually different personalities, and the at least one processor sets the growth level to a maximum value among the personality values.

7. The robot according to claim 5, wherein the at least one processor changes, in accordance with the external stimulus detected by the sensor, an emotion parameter expressing a pseudo-emotion of the robot, and sets the personality parameter based on the emotion parameter.

8. A robot control method for controlling a robot that autonomously acts, the robot comprising a sensor and a memory storing a table including priority data, and the robot control method comprising:

causing, in response to a predetermined action trigger being satisfied, the robot to execute a selected action selected corresponding to the action trigger, the selected action being selected from among actions of a selection candidate list at a selection probability dependent on a growth level, and the growth level representing a degree of pseudo-growth of the robot;

increasing, in response to the sensor detecting an external stimulus of a first classification during a period from when the robot is caused to execute the selected action until an elapse of a predetermined time, the selection probability that the selected action is selected from among the actions of the selection candidate list within a range less than or equal to a predetermined upper limit; and decreasing, in response to increasing the selection probability that the selected action is selected from among the actions of the selection candidate list in accordance with detection of the external stimulus of the first classification, selection probabilities that actions other than the selected action are selected from among the actions of the selection candidate list, wherein:

in the table including the priority data, each of the actions of the selection candidate list is stored in association with a predetermined priority used when the selection probability thereof is decreased, and for each of the actions, a decrease value of the selection probability that the action is selected is a predetermined value determined based on the predetermined priority stored in the table in association with the action.

9. The robot control method according to claim 8, wherein:

for each action in the selection candidate list, an initial value of the selection probability is set in accordance with the growth level, and the predetermined upper limit is defined based on the initial value that is set for the selected action in a case where the growth level is lower than a current growth level.

10. The robot control method according to claim 8, further comprising, in response to the sensor detecting the external stimulus of the first classification during the period from when the robot is caused to execute the selected action until the elapse of the predetermined time:

in a case where the selection probability set for the selected action at a current growth level is less than or equal to the selection probability set for the selected action at a growth level lower than the current growth level, increases, with the predetermined upper limit, the selection probability that the selected action is selected from among the actions of the selection candidate list, the predetermined upper limit being a value of the selection probability set for the selected action at the growth level lower than the current growth level, and in a case where the selection probability set for the selected action at the current growth level is greater than the selection probability set for the selected action at the growth level lower than the current growth level, does not increase the selection probability that the selected action is selected from among the actions of the selection candidate list.

11. The robot control method according to claim 8, further comprising, in response to the sensor detecting the external stimulus of a second classification during the period from when the robot is caused to execute the selected action until the elapse of the predetermined time, the selection probability that the selected action is selected from among the actions of the selection candidate list is decreased and a selection probability of at least one action other than the selected action from among the actions of the selection candidate list is increased within a range less than or equal to a predetermined upper limit.

12. The robot control method according to claim 8, further comprising setting a personality parameter expressing a pseudo-personality of the robot, and setting the growth level based on the personality parameter.

13. The robot control method according to claim 12, wherein:

the personality parameter includes personality values that express degrees of mutually different personalities, and the growth level is set to a maximum value among the personality values.

14. The robot control method according to claim 12, further comprising changing an emotion parameter expressing a pseudo-emotion of the robot in accordance with the external stimulus detected by the sensor, and setting the personality parameter based on the emotion parameter.

15. A non-transitory computer-readable recording medium storing a program for controlling a computer of a robot that autonomously acts, the robot comprising a sensor and a memory storing a table including priority data, and the program being executable by the computer to control the robot to execute processing comprising:

causing, in response to a predetermined action trigger being satisfied, the robot to execute a selected action selected corresponding to the action trigger, the selected action being selected from among actions of a selection candidate list at a selection probability dependent on a growth level, and the growth level representing a degree of pseudo-growth of the robot;

increasing, in response to the sensor detecting an external stimulus of a first classification during a period from when the robot is caused to execute the selected action until an elapse of a predetermined time, the selection probability that the selected action is selected from among the actions of the selection candidate list within a range less than or equal to a predetermined upper limit; and decreasing, in response to increasing the selection probability that the selected action is selected from among the actions of the selection candidate list in accordance with detection of the external stimulus of the first classification, selection probabilities that actions other than the selected action are selected from among the actions of the selection candidate list, wherein:

in the table including the priority data, each of the actions of the selection candidate list is stored in association with a predetermined priority used when the selection probability thereof is decreased, and for each of the actions, a decrease value of the selection probability that the action is selected is a predetermined value determined based on the predetermined priority stored in the table in association with the action.

16. The robot according to claim 1, wherein an amount of the decrease value is set higher in accordance with an increase in the predetermined priority.

17. The robot according to claim 1, wherein the selection candidate list is set such that, as the growth level increases, a new action is exhibited as a new selection candidate.

18. The robot according to claim 17, wherein a higher priority is assigned for a newly exhibited action as the growth level increases.

* * * * *